(12) United States Patent
Navarro Felix et al.

(10) Patent No.: US 10,223,921 B2
(45) Date of Patent: Mar. 5, 2019

(54) AIR VEHICLE NAVIGATION SYSTEMS AND METHODS USING A COMMON RUNTIME AIRCRAFT INTENT DATA STRUCTURE

(71) Applicant: The Boeing Company, Chicago, IL (US)

(72) Inventors: Francisco A. Navarro Felix, Madrid (ES); Carlos Querejeta Masaveu, Madrid (ES); Jesús Cuadrado Sanchez, Madrid (ES); Gary Viviani, Lyle, WA (US)

(73) Assignee: The Boeing Company, Chicago, IL (US)

( * ) Notice: Subject to any disclaimer, the term of this patent is extended or adjusted under 35 U.S.C. 154(b) by 141 days.

(21) Appl. No.: 15/251,721

(22) Filed: Aug. 30, 2016

(65) Prior Publication Data

US 2017/0061804 A1 Mar. 2, 2017

(30) Foreign Application Priority Data

Aug. 31, 2015 (EP) ..................... 15382435

(51) Int. Cl.
*G08G 5/00* (2006.01)
*G05D 1/10* (2006.01)
(Continued)

(52) U.S. Cl.
CPC ........... *G08G 5/003* (2013.01); *G05D 1/0088* (2013.01); *G05D 1/0202* (2013.01); *G05D 1/101* (2013.01);
(Continued)

(58) Field of Classification Search
CPC .... G08G 5/003–5/0039; G08G 5/0047; G08G 5/0069; G05D 1/0088; G05D 1/0202; G05D 1/101–1/108
See application file for complete search history.

(56) References Cited

U.S. PATENT DOCUMENTS 8,756,257 B2 6/2014 Szyperski et al.
2010/0305781 A1 12/2010 Félix
(Continued)

FOREIGN PATENT DOCUMENTS

EP 2040137 3/2009
EP 2482269 8/2012
(Continued)

OTHER PUBLICATIONS

Extended European Search Report, issued by the European Patent Office in connection with European Patent Application No. 15382435A, dated Feb. 19, 2016, 9 pages.
(Continued)

*Primary Examiner* — Spencer D Patton
(74) *Attorney, Agent, or Firm* — Hanley, Flight & Zimmerman, LLC

(57) ABSTRACT

Example air vehicle navigation systems and methods are described herein that utilize a Common Runtime Aircraft Intent Data Structure (CRAIDS). An example method includes determining an initial condition of a flight of an air vehicle, determining a flight constraint, determining, using a common runtime aircraft intent data structure (CRAIDS), an aircraft trajectory based on the initial condition and the flight constraint, and performing the determined aircraft trajectory during the flight of the air vehicle.

19 Claims, 13 Drawing Sheets

(51) Int. Cl.
*G05D 1/02* (2006.01)
*G05D 1/00* (2006.01)
(52) U.S. Cl.
CPC ......... *G08G 5/0034* (2013.01); *G08G 5/0039* (2013.01); *G08G 5/0047* (2013.01)

(56) References Cited

U.S. PATENT DOCUMENTS

| | | |
|---|---|---|
| 2012/0290154 A1 | 11/2012 | Lopez Leones et al. |
| 2013/0317670 A1 | 11/2013 | Magana Casado et al. |
| 2014/0336932 A1 | 11/2014 | Leones et al. |
| 2015/0226576 A1 | 8/2015 | Felix et al. |
| 2015/0253779 A1 | 9/2015 | Navarro et al. |

FOREIGN PATENT DOCUMENTS

| | | |
|---|---|---|
| EP | 2685440 | 1/2014 |
| EP | 2801963 | 11/2014 |
| EP | 2916308 | 9/2015 |
| WO | 2009042405 | 4/2009 |

OTHER PUBLICATIONS

SESAR Joint Undertaking (SJU), European ATM Master Plan, The Roadmap for Sustainable Air Traffic Management, Oct. 2012, 100 pages.
Integration of Civil Unmanned Aircraft Systems (UAS) in the National Airspace System (NAS) Roadmap. U.S. Department of Transportation Federal Aviation Administration, Nov. 2013, 74 pages.
Centralised Service on 4D Trajectory Calculation for Planning Purposes (4DPP)—Concept of Operations (CONOPS). Eurocontrol, Oct. 23, 2013, 46 pages.
Presagis, White Paper: Understanding ARINC 661 and the benefits of 661-based development tools, 2014, 20 pages.
López-Leonés, "Definition of an Aircraft Intent Description Language for Air Traffic Management Applications," PhD Thesis, University of Glasgow, Feb. 2008, 415 pages.
Federal Aviation Administration, Joint Planning and Development Office (JPDO). "NextGen Implementation Plan," Jun. 2016, 86 pages.
Mondoloni et al., Proposed Trajectory Prediction and Exchange Information Items for Flight Information Exchange Model (FIXM), Nov. 2012, 113 pages.
López-Leonés et al., "The Aircraft Intent Description Language: A Key Enabler for Air/Ground Synchronization in Trajectory-Based Operations," Proceedings of the 26th Digital Avionics Systems Conference, Institute of Electrical and Electronic Engineers, Inc., Oct. 2007, 12 pages.
"Roadmap for the integration of civil Remotely-Piloted Aircraft Systems into the European Aviation System," Final report from the European RPAS Steering Group, Jun. 2013, 16 pages.
Vilaplana et al., "Towards a Formal Language for the Common Description of Aircraft Intent," Proceedings of the 24th Digital Avionics Systems Conference, Washington DC, USA, Institute of Electrical and Electronic Engineers, Inc (IEEE) Oct. 2005, 9 pages.

AIR VEHICLE NAVIGATION SYSTEMS AND METHODS USING A COMMON RUNTIME AIRCRAFT INTENT DATA STRUCTURE

RELATED APPLICATION

This patent claims priority to European Patent Application No. 15382435.4, filed Aug. 31, 2015, and titled "Air Vehicle Navigation Method Via A Common Runtime Aircraft Intent Data Structure," which is hereby incorporated by this reference in its entirety.

TECHNICAL FIELD

The present disclosure relates to air vehicle navigation and, more particularly, to air vehicle navigation systems and methods using a common runtime aircraft intent data structure.

BACKGROUND

Current Air Traffic Management (ATM) Systems are being developed according to an approach focused on increasing capacity, efficiency and safety, while reducing environmental impact. These objectives require a paradigm shift from a system that manages aerospace based on tactical intervention by human operators to a more strategic, integrated and collaborative system that relies on coordinated and strategic trajectory de-confliction supported by advanced automation tools. According to the new paradigm, the aircraft trajectory becomes the centerpiece of a new set of operating procedures collectively referred to as Trajectory Based Operations (TBO).

TBO is the subject of extensive investigation worldwide within the course of the major ATM modernization and UAS (Unmanned Aerial Systems) insertion initiatives, where it is recognized that novel methods to define and predict aircraft trajectories with higher fidelity and accuracy are needed along with advanced tools to enable their computational treatment to facilitate the introduction of higher levels of automation and autonomy in air vehicle operations.

Aircraft Intent Description Language (AIDL) is a first attempt to define aircraft trajectories unambiguously. When defining and executing air vehicle trajectories defined by using AIDL, six functions can be acknowledged: a) Trajectory Modeling; b) Intent Generation; c) Intent Inference; d) Trajectory Prediction; e) Flight Control; and 0 State Estimation.

Trajectory Modeling includes planning, editing and visualizing intended aircraft trajectories, using Aircraft Intents (AI), which unequivocally define a precise way an air vehicle is to be operated. In other words, by use of an AI-based Trajectory Modeling, a precise a priori definition of aircraft guidance strategy and aircraft motion is achieved, thus precisely defining an aircraft trajectory.

Intent Generation includes finding a determinate AI that satisfies a given constraint or a given set of constraints to which the desired aircraft trajectory must be restricted.

Intent Inference includes discovering (inferring) the most likely AI that gave rise to (e.g., that affected) a known aircraft trajectory through reverse engineering from observations of its geometry and timing (e.g., from radar tracks, telemetry data or recorded navigation data).

Trajectory Prediction includes determining (predicting) an aircraft trajectory that results from a given instance of AI based on models of the aircraft performance and the atmospheric conditions (pressure, temperature and wind) in which the flight takes place.

Flight Control includes automatically and precisely executing a given instance of AI.

State Estimation includes making use of the precise information included within an AI instance to find air vehicle state information at a certain point along its trajectory.

After several years of investigation in the field of ATM systems, many problems have been found that are worth being addressed. The first of these problems refers to a lack of a common shared data structure to handle aircraft instances in AIDL. The abovementioned functions related to ATM are typically tackled by use of modules which either produce or consume AIDL instances. Thus, there is a need to develop a common AIDL data structure for defining aircraft trajectories, for the different modules involved in air vehicle trajectory definition and execution to take advantage thereof.

Another problem concerning ATM systems can be regarded as a lack of unified interface to address all of the abovementioned functions. An additional problem refers to a lack of standard encoding for the AI instances. It would be desirable to develop a standard way in which to encode and serialize AIDL instances. Another problem that can be observed when facing trajectory definition and execution using AIDL refers to the validation of AI instances. Because AIDL is a formal language, there must be a series of lexical and syntactical rules that should be validated to ensure that a determinate AI instance makes sense or satisfactorily fulfils the requirements established by the user or ATM system manager.

SUMMARY

An example method disclosed herein includes determining an initial condition of a flight of an air vehicle, determining a flight constraint, determining, using a common runtime aircraft intent data structure (CRAIDS), an aircraft trajectory based on the initial condition and the flight constraint, and performing the determined aircraft trajectory during the flight of the air vehicle. In some examples, using the CRAIDS includes determining a number of degrees of freedom of the air vehicle and determining a trajectory thread for each of the degrees of freedom, where each of the trajectory threads includes a series of instruction nodes including instructions that define how to fly the air vehicle according to the corresponding degree of freedom. In some examples, using the CRAIDS further includes determining, for each of the trajectory threads, the instructions of the corresponding trajectory thread that satisfy the flight constraint, determining validity of each of the instructions of each of the trajectory threads, establishing a trigger node including a trigger associated with each of the instruction nodes in each of the trajectory threads, where each of the triggers determines an end of validity of the associated instruction and a start of validity of a subsequent instruction within the corresponding trajectory thread, and sequencing the instructions and the associated triggers in each of the trajectory threads to fly the air vehicle according to the instructions.

Disclosed herein is an example computer readable storage medium having instructions that, when executed, cause a machine to at least determine an initial condition of a flight of an air vehicle, determine a flight constraint and determine, using a common runtime aircraft intent data structure (CRAIDS), an aircraft trajectory based on the initial condition and the flight constraint. To use the CRAIDS, the instructions cause the machine to at least determine a number of degrees of freedom of the air vehicle; determine a trajectory thread for each of the degrees of freedom, where each of the trajectory threads includes a series of instruction nodes including instructions that define how to fly the air vehicle according to the corresponding degree of freedom; determine, for each of the trajectory threads, the instructions of the corresponding trajectory thread that satisfy the flight constraint; determine validity of each of the instructions of each of the trajectory threads; establish a trigger node including a trigger associated with each of the instruction nodes in each of the trajectory threads, where each of the triggers determines an end of validity of the associated instruction and a start of validity of a subsequent instruction within the corresponding trajectory thread; and sequence the instructions and the associated triggers in each of the trajectory threads to fly the air vehicle according to the instructions. The example instructions also cause the machine to perform the determined aircraft trajectory during the flight of the air vehicle.

Figure 1:
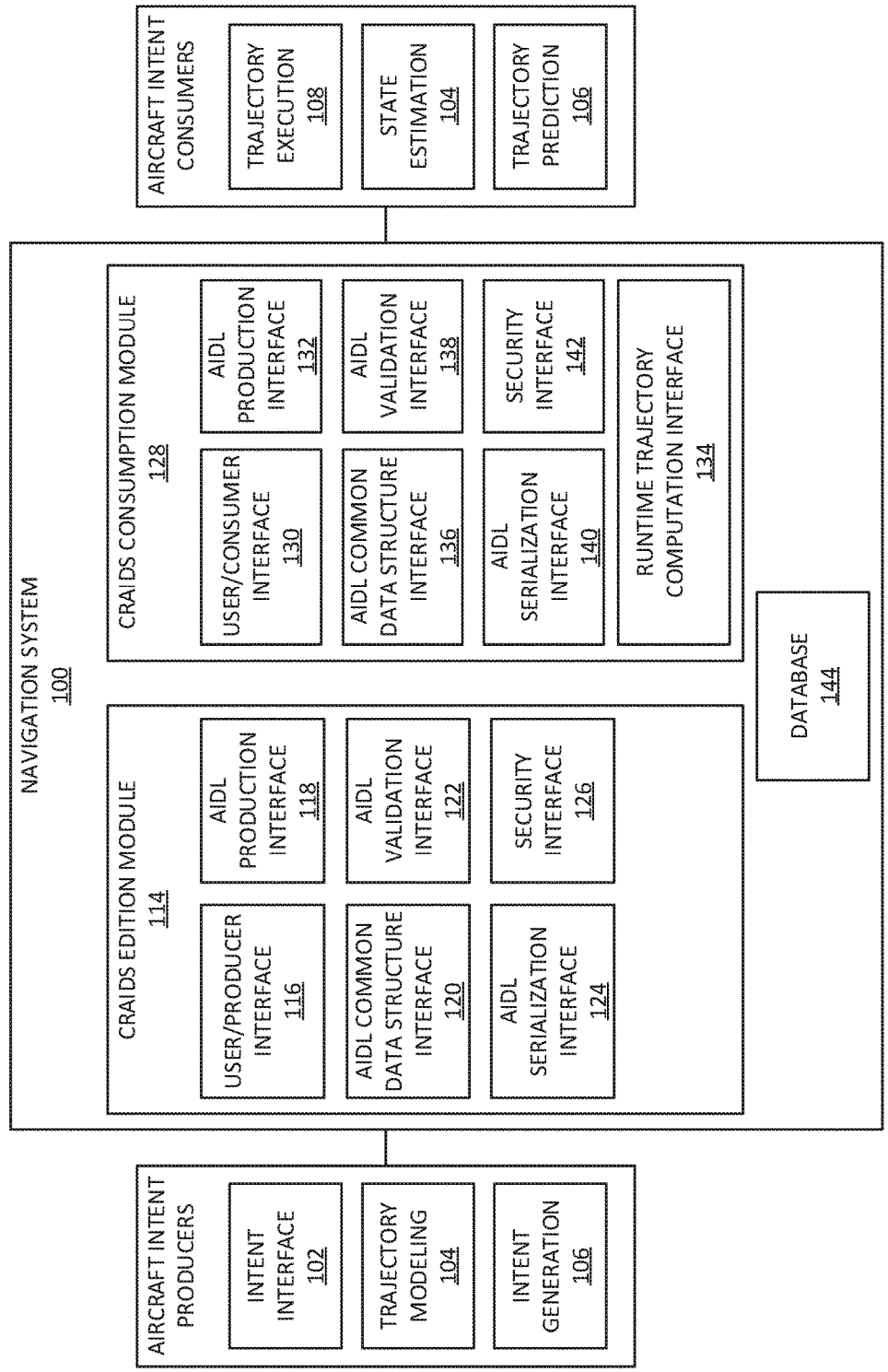
FIG. 1 is a schematic diagram of an example navigation system and example modules, including functions and/or systems that produce and/or use Aircraft Trajectories making use of an example Common Runtime Aircraft Intent Data Structure (CRAIDS).

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

Example air vehicle navigation systems and methods are disclosed herein. The example systems and methods may be implemented to define aircraft trajectories that an air vehicle follows. The aircraft trajectories are defined in an Aircraft Intent Description Language (AIDL) that unequivocally defines the way an air vehicle is to be operated to follow a determined aircraft trajectory. The aircraft trajectories are defined and edited by use of a Common Runtime Aircraft Intent Data Structure (CRAIDS) that establishes a hierarchy and centralizes dependencies among instructions that define an aircraft trajectory. The example systems and methods of the present disclosure are applicable in the field of civil and military Air Traffic Management (ATM), Air Traffic Control and Air Traffic Navigation and Planning, for example.

An example air vehicle navigation method includes determining initial conditions for a flight and establishing a set of trajectory requirements or flight constraints regarding an aircraft trajectory that an air vehicle is to follow. The example method also includes defining and editing an aircraft trajectory according to the established constraints and the initial conditions, and flying the air vehicle according to the defined trajectory. In some examples, the aircraft trajectory definition makes use of AIDL.

To solve the inconveniences and address the issues mentioned in the background, example air vehicle navigation systems and methods are disclosed herein. An example method includes:
  a) establishing one or more initial conditions for an air vehicle flight;
  b) establishing one or more flight constraints;
  c) determining, using a Common Runtime Aircraft Intent Data Structure (CRAIDS), an aircraft trajectory based on the initial condition(s) and the flight constraint(s); and
  d) performing the determined aircraft trajectory during flight of the air vehicle.

In some examples, in addition to or as an alternative to operations associated with item "d)" above, the example method includes computing and/or simulating the execution of the determined aircraft trajectory (e.g., for the purposes of flight predictability).

In some examples, using the CRAIDS to determine the aircraft trajectory includes:
  i) determining a number of degrees of freedom for flying the air vehicle;
  ii) determining a trajectory thread for each of the degrees of freedom, wherein each of the trajectory threads includes a series of instruction nodes including instructions that unequivocally define how to fly the air vehicle according to the corresponding degree of freedom;
  iii) determining, for each of the trajectory threads, the instructions of the corresponding trajectory that satisfy the flight constraint(s);
  iv) determining validity of each of the instructions of each of the trajectory threads;
  v) establishing a trigger node including a trigger associated with each of the instruction nodes in each of the trajectory threads, wherein each of the triggers determines an end of validity of the instruction to which it is associated and a start of validity of the next (e.g., subsequent, following, etc.) instruction within the corresponding trajectory thread; and vi) sequencing the instructions and associated triggers in each of the trajectory threads.

As a result, when flying the air vehicle according to the instructions in the specified sequence, the air vehicle satisfies the flight constraint(s) at every stage throughout the flight.

In some examples, the validity refers at least one of:
a specific period of time;
a value or range of values concerning a flight variable; or
a validity of another instruction of either the same or another trajectory thread.

In some examples, performing the determined aircraft trajectory includes
 a. determining a set of operations to be performed by the air vehicle based on the determined aircraft trajectory; and
 b. commanding the air vehicle to execute the set of operations.

In some examples, determining the set of operations includes:
updating a state vector of the air vehicle (the air vehicle's state vector including one or more flight related variable(s));
assessing, based on the state vector, which of the instructions in each of the trajectory threads are still valid by evaluating the triggers and conditions in each of the trajectory threads; and
determining operations to be performed so that, when executed by the air vehicle, the air vehicle flies according to the instructions (and associated effects) that are still valid.

In some examples, determining the set of operations includes:
 a) obtaining the initial condition(s) for a flight;
 b) determining a first operation of the set of operations, wherein the first operation includes first instructions in each of the trajectory threads and effects associated to with the first instructions;
 c) updating the state vector of the air vehicle while the first operation is performed, wherein the state vector includes one or more flight related variable(s);
 d) assessing, based on the state vector, which of the instructions in each of the trajectory threads are still valid (e.g., by evaluating the triggers and conditions in each thread);
 e) determining next operations (updating operations) within the set of operations, wherein a next operation of the set of operations includes the instructions that are still valid at a given stage of the aircraft trajectory and the effects associated to the valid instructions; and
 f) ending (completing) trajectory computation (e.g., the determined aircraft trajectory) when, at a given stage of the flight trajectory, no instructions upon a thread are still valid.

In some examples, the method includes verifying Aircraft Intent Description Language syntax (AIDL) syntax of the instructions of at least one of the trajectory threads (e.g., of the edited trajectory), to ensure that aircraft performance limitations are respected, that all of the instructions are logical and coherent with one another, and that the trajectory threads are complete.

In some examples, at least one of the instruction nodes of at least one of the trajectory threads of the aircraft trajectory is a composite node, wherein a composite node includes a set of instruction nodes (e.g., focused on solving a particular task) with associated trigger nodes. In some examples, with regards to a composite node:
 1. the fulfillment of a condition associated with a trigger in the trajectory thread that precedes (e.g., immediately precedes) the composite node starts the validity of a first instruction of the composite node; and
 2. the fulfillment of a condition of a trigger in the composite node that is associated with a last instruction in the composite node starts the validity of an instruction in the trajectory thread that follows (e.g., immediately follows, is next to, is subsequent to, etc.) the composite node.

In some examples, at least one of the instruction nodes of at least one of the trajectory threads of the aircraft trajectory is a conditional composite node, wherein a conditional composite node includes at least two sets of instruction nodes with associated trigger nodes. In some examples, with regards to a conditional composite node:
 1. the start of validity of either set of instruction nodes of the conditional composite node is subjected to the fulfillment of a condition of the conditional composite node;
 2. the fulfillment of the condition associated with a trigger in the trajectory thread that precedes the conditional composite node starts the assessment of the condition of the conditional composite node; and
 3. the fulfillment of the condition of a trigger in the conditional composite node that is associated to the last instruction in either set of instructions of the conditional composite node starts the validity of an instruction in the trajectory thread that follows the conditional composite node.

In some examples, at least one of the instruction nodes of at least one of the trajectory threads of the aircraft trajectory is a loop node, wherein a loop node includes a set of instruction nodes with their associated trigger nodes. In some examples, with regards to a loop node:
 1. the fulfillment of the condition associated to a trigger in the trajectory thread that precedes the loop node starts the assessment of a main condition of the loop node;
 2. the start of validity of a first instruction of the set of instructions including the loop node is subjected to the fulfillment of the mentioned main condition of the loop node;
 3. if the main condition of the loop node is not fulfilled, the validity of the loop node ends and an instruction in the thread following the loop node starts its validity; and
 4. the fulfillment of a condition of a trigger node that is associated with the last instruction node in the set of instruction nodes starts again the assessment of the main condition of the loop node.

In some examples, the deletion of a node (e.g., one of the instruction nodes) in a trajectory thread results in deleting all sets of instruction nodes including within the deleted node (e.g., deleting the child nodes pending from the deleted node).

In some examples, each of the trajectory threads defines a branch of a hierarchical tree, the hierarchical tree including a root node defining the aircraft trajectory, wherein the branches defined by each of the trajectory threads directly derive (e.g., depend) from the root node, such that each of the branches defines the aircraft trajectory according to a different one of the degrees of freedom.

In some examples, at least one of the trajectory threads includes instructions to unequivocally define motion of the air vehicle in a vertical plane. In some examples, at least one of the trajectory threads includes instructions to unequivocally define motion of the air vehicle in a horizontal plane (e.g., includes instructions to fly the air vehicle towards certain waypoints in a horizontal plane in accordance with the aircraft trajectory). In some examples, at least one of the trajectory threads includes instructions to unequivocally define maneuvers of the air vehicle at each stage of the flight (e.g., to perform certain maneuvers such as landing gear deployment). In some examples, at least one of the trajectory threads includes instructions to unequivocally define/specify a speed and acceleration of the air vehicle.

In some examples, the end of validity of an instruction within a determined thread is established by the activation of a trigger that is associated with that instruction. In some examples, the activation of the trigger establishes the start of validity of the next instruction in that thread (the instruction immediately following that trigger). In some examples, the activation of a trigger is subjected to the fulfillment of a condition specified by the trigger and/or the activation of another trigger associated to another instruction in any thread (e.g., the same thread or a different thread). In this manner, different instructions within the same and/or different threads may be synchronized.

These and other example methods, apparatus/systems and articles of manufacture (e.g., physical stage media) to implement the example methods are disclosed in further detail herein.

In some examples, a CRAIDS is a data structure that centralizes and unifies the different interfaces of aircraft systems that produce and use aircraft trajectories. In some examples, a CRAIDS centralizes the serialization and persistence of an AIDL-based aircraft trajectory. In some examples, a CRAIDS is a system that centralizes the syntactical/lexical validation of an aircraft trajectory defined by use of AIDL. In some examples, a CRAIDS is a set of services that centralize the security of production/consumption of AIDL-based aircraft trajectories.

FIG. 1 shows a schematic diagram of different functions/systems concerning the present air vehicle navigation apparatus and methods that may interface with an example air vehicle navigation system 100 (also referred to as Common Runtime Aircraft Intent Data Structure (CRAIDS) system).

In the illustrated example of FIG. 1, there are six functions/systems (which are divided into modules 102, 104, 106, 108, 110, 112 represented by boxes) involved in trajectory definition and execution. The six functions/systems make use of Aircraft Intents, AI, expressed in AIDL. Three functions/systems relate to what can be regarded as Trajectory Consumption (Aircraft Intent Consumers 108, 110, 112). The other three functions/systems may be regarded as Trajectory Production functions/systems (Aircraft Intent Producers 102, 104, 106).

As illustrated in the example of FIG. 1, there are three main AI producers: Intent Inference 102, Trajectory Modeling 104 and Intent Generation 106. There are also three main AI consumers: Trajectory execution (also called Flight Control (FC)) 108, State Estimation 110, and Trajectory Prediction 112.

Example methods are disclosed herein to define and edit an aircraft trajectory by use of a data structure that, for the purposes of the present disclosure, is referred to as CRAIDS (Common Runtime Aircraft Intent Data Structure). However, the term "CRAIDS" should be understood to generally encompass any data structure that processes and interprets intended trajectories based on AIDL in accordance in accordance with the examples disclosed herein. In the illustrated example, the example navigation system 100 of FIG. 1 may be used to implement the example navigation methods disclosed herein. The navigation system 100 may be implemented to interface with one or more of the example intent producers or intent consumers (blocks 102-112) to define and/or edit aircraft trajectories as disclosed herein. While the example navigation system 100 is depicted as a separate block, the example navigation system 100 may be implemented by (e.g., incorporated into) one or more of the intent producers 102-106 or the intent consumers 108-112. In the illustrated example, the navigation system 100 includes a CRAIDS edition module 114 to create and/or edit (e.g., modify, alter, etc.) an aircraft trajectory using a CRAIDS. In the illustrated example, the CRAIDS edition module 114 includes a User/Producer interface 116, an AIDL production interface 118, an AIDL common data structure interface 120, an AIDL validation interface 122, an AIDL serialization interface 124, and a security interface 126. The navigation system 100 of the illustrated example also includes a CRAIDS consumption module 128 to implement an aircraft trajectory using a CRAIDS. In the illustrated example, the CRAIDS consumption module 128 includes a User/Consumer interface 130, an AIDL production interface 132, a runtime trajectory computation interface 134, an AIDL common data structure interface 136, an AIDL validation interface 138, a serialization interface 140, and a security interface 142. In the illustrated example, the navigation system 100 also includes a database 144. The example interfaces are discussed in further detail herein.

Figure 2:
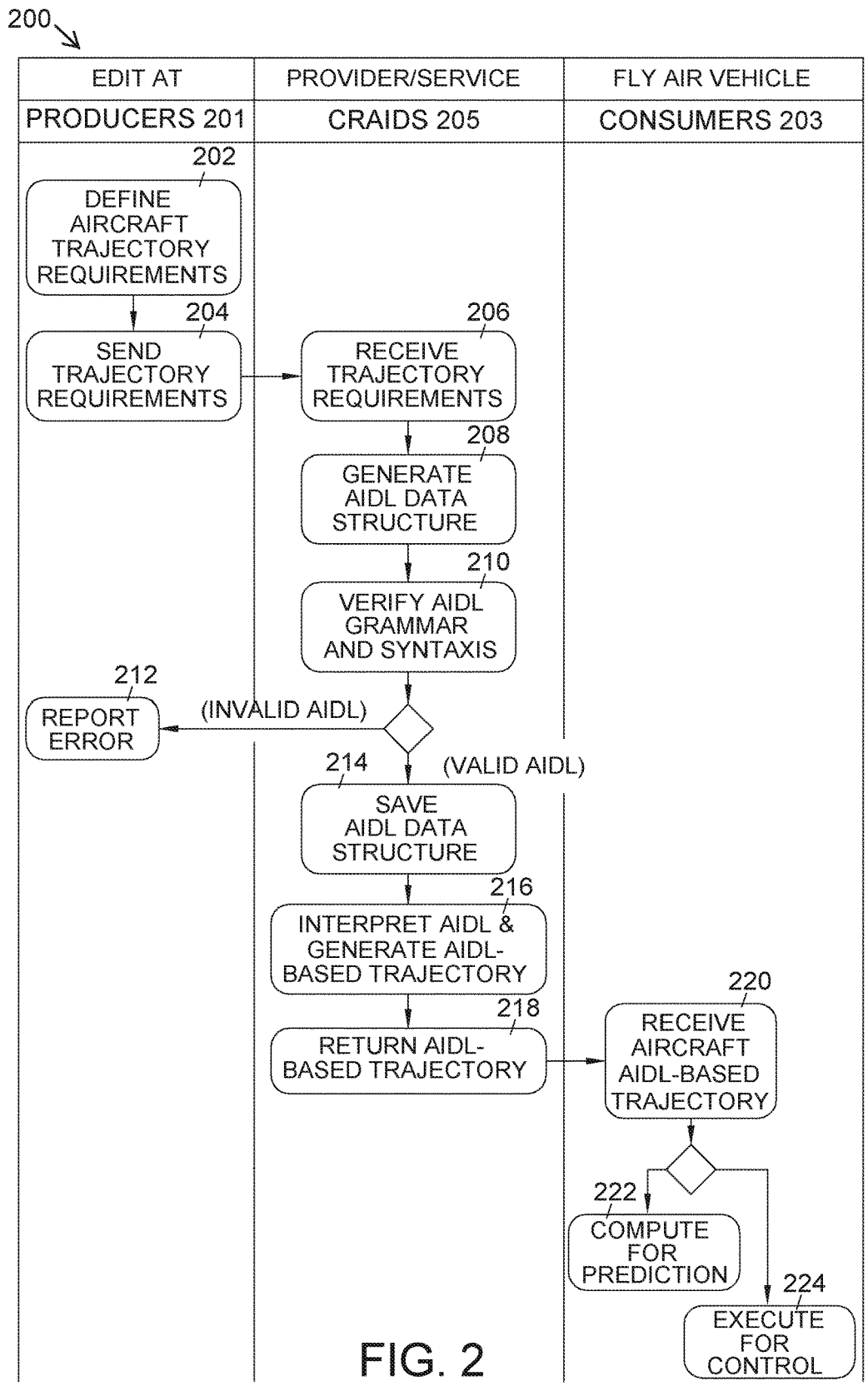
FIG. 2 is a sequence diagram illustrating an example method of editing (producing) an aircraft trajectory using AIDL and flying an air vehicle making use of a CRAIDS in which aircraft trajectories are edited.

FIG. 2 is a sequence diagram illustrating an example process or method 200 of editing (e.g., producing) an aircraft trajectory using AIDL and flying (and/or computing the aircraft trajectory of) an air vehicle making use of CRAIDS (in which aircraft trajectories are edited), and how these example processes are related. The sequence diagram of the example method 200 is divided into three columns representing interfaces of AI Producers 201, AI Consumers 203 and a CRAIDS interface 205, where the interfaces 201, 203, 205 are respectively named as "EDIT AT" (for Aircraft Trajectory edition), Fly Air Vehicle and Provider/Service (as the interface for CRAIDS). The example AI Producers 201 may correspond to one or more of the example aircraft intent producers of FIG. 1 (e.g., the interest inference 102, the trajectory modeling 104 and/or the intent generation 106), the example AI Consumers 203 may correspond to one or more of the example aircraft intent consumers of FIG. 1 (e.g., the trajectory execution 108, the state estimation 110, the trajectory prediction 112), and the example CRAIDS interface 205 may correspond to the example navigation system 100 of FIG. 1.

In the illustrated example of FIG. 2, the AI Producers 201 (e.g., systems and/or users wanting to edit an aircraft trajectory) first define 202 one or more aircraft trajectory requirements and send 204 the requirement(s) to the CRAIDS interface 205 (e.g., to an edition module incorporating CRAIDS, such as the CRAIDS edition module 114 of FIG. 1).

When the CRAIDS interface 205 receives 206 these trajectory requirements, the CRAIDS interface 205 generates 208 an AIDL data structure, CRAIDS, defining the aircraft trajectory and verifies 210 grammar and syntax rules of the generated CRAIDS. If the syntax and/or grammar is invalid (e.g., as determined by the CRAIDS interface 205), the CRAIDS interface 205 returns an error 212 to the AI Producers 201, indicating that there may be one or more inconsistencies in the initial conditions and/or flight requirements. If the syntax and grammar of the generated CRAIDS are found to be valid (e.g., as determined by the CRAIDS interface 205), the CRAIDS defining an aircraft trajectory is saved 214 (e.g., in the database 144 of FIG. 1).

Whenever the AI Consumers 203 (e.g., systems and/or users wanting to take advantage of a pre-defined aircraft trajectory defined and edited by CRAIDS) want to check and/or use an aircraft trajectory, the AI Consumers 203 open a file where the CRAIDS is saved, the CRAIDS interface 205 interprets the saved CRAIDS and generates 216 an AIDL-based trajectory and returns 218 the AIDL-based trajectory to the AI Consumers 203. The AI Consumers 203 receive 220 the AIDL-based aircraft trajectory and, depending on which type of consumption it may want to perform (a Trajectory Prediction (TP) or a Flight Control (FC)), it either computes 222 a trajectory/partial trajectory or it executes 224 the AIDL-based trajectory, thus commanding the air vehicle to execute maneuvers tending to execute an aircraft trajectory as defined by CRAIDS.

In some examples, definition/edition of an aircraft trajectory making use of CRAIDS includes defining the aircraft trajectory according to at least four different threads (also referred to as patterns or approaches). Each of the threads is an approach of aircraft trajectory according to a different degree of freedom.

Figure 3:
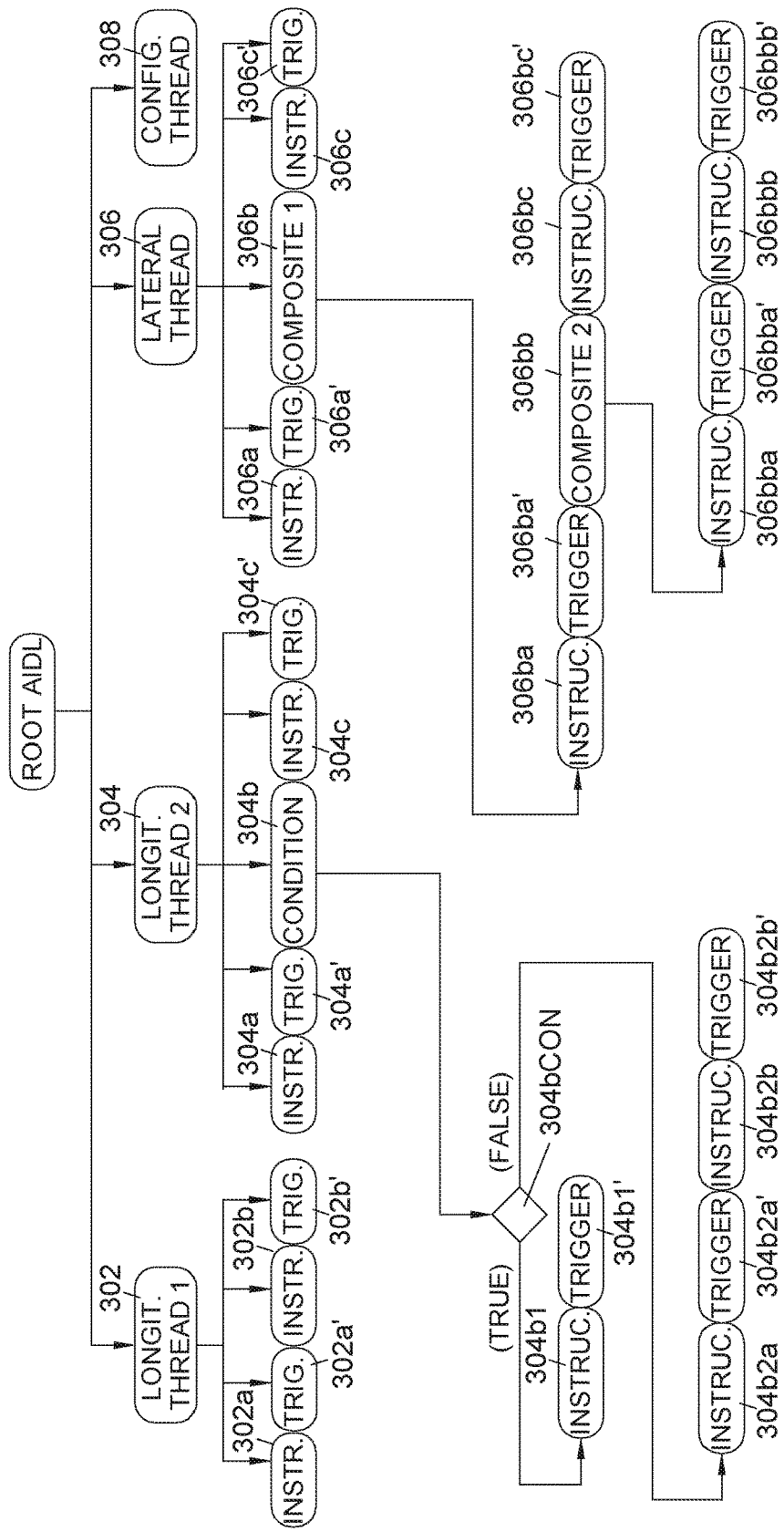
FIG. 3 illustrates an example aircraft trajectory described in different threads, according to CRAIDS, in which a hierarchical tree structure with different nodes may be appreciated.
Figure 4:
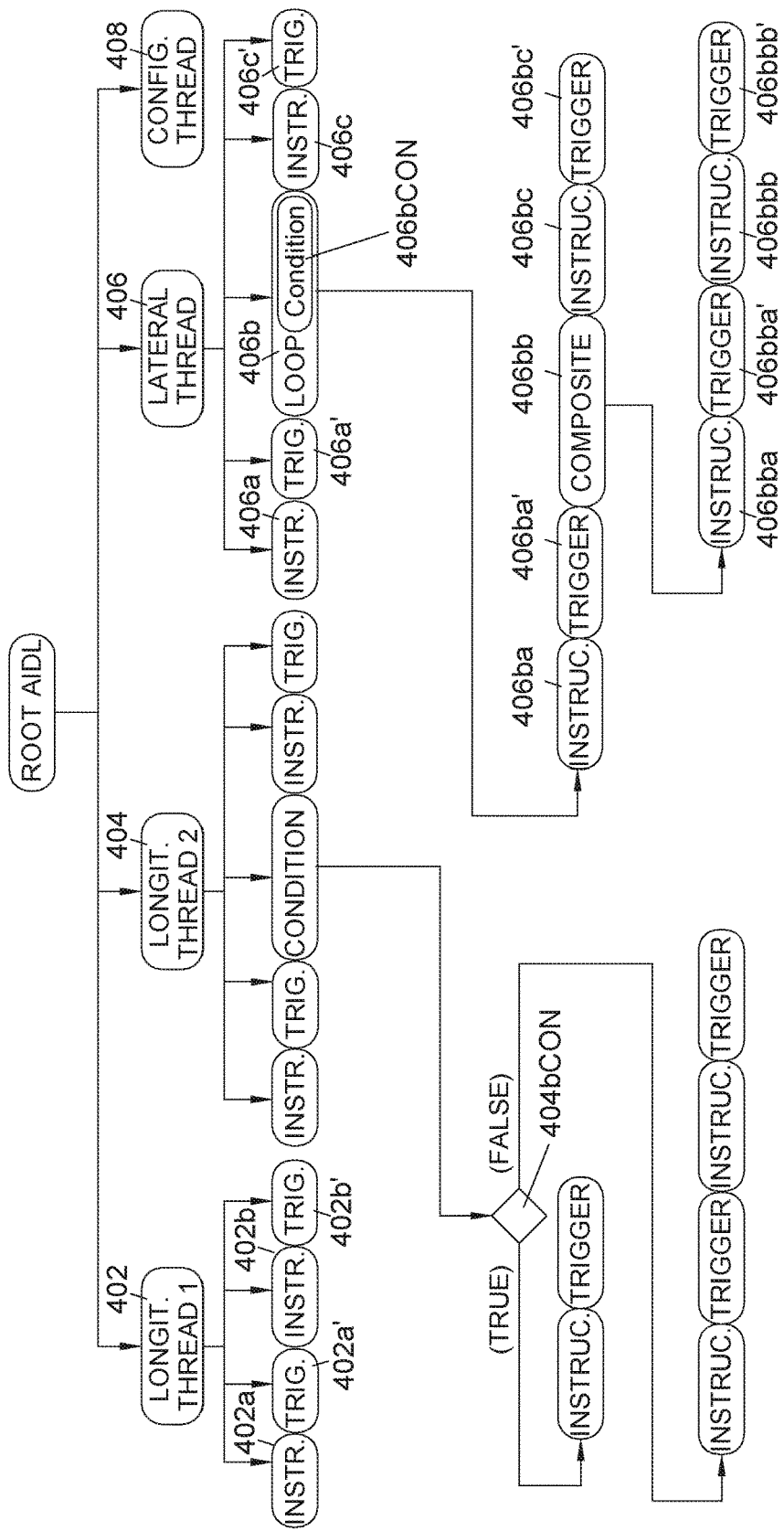
FIG. 4 illustrates a complementary hierarchical tree to the aircraft trajectory illustrated in FIG. 3 in which one of the nodes (Composite Node "Composite 1" in Lateral Thread) has been replaced by another node (Loop node).

FIGS. 3 and 4 schematically depict how an example aircraft trajectory is defined/edited by a CRAIDS, where the threads of the corresponding aircraft trajectory are shown. The aircraft trajectory may be computed (e.g., via trajectory prediction) or flown/executed (e.g., via flight control). The edition of the aircraft trajectory, as explained below, can be assumed as the edition of a hierarchical tree in which the Root Node (e.g., Root AIDL Node) is the Aircraft Trajectory and the other nodes (e.g., child nodes) of the hierarchical tree refer to instructions and/or conditions that need to be fulfilled to define the aircraft trajectory in all its degrees of freedom. An instruction specifies a certain effect (e.g., altitude constraint) and a certain value (specifier) for said effect. A trigger specifies the termination (e.g., the end of validity) of the instruction immediately before the trigger.

In the illustrated examples of FIGS. 3 and 4, one of the four threads is referred to as "Longitudinal Thread 1" 302, 402. Longitudinal Thread 1 defines an aircraft trajectory using of a series of instructions 302a, 302b, 402a, 402b that unequivocally define aircraft motion in a vertical plane (e.g., the instructions 302a, 302b, 402a, 402b are directed to fix one degree of freedom in the aircraft's motion, namely the altitude). The instructions 302a, 302b, 402a, 402b concern determinate altitudes or altitude ranges to which the air vehicle must restrict when flying along certain waypoints.

Longitudinal Thread 1 includes both instructions 302a, 302b, 402a, 402b (an altitude constraint to be fulfilled) and triggers 302a', 302b', 402a', 402b'. In the illustrated example, a trigger determines an end of a period of validity of an instruction and a beginning of a period of validity of the next instruction in the thread. Both the instruction and the corresponding trigger may be conditioned to the fulfillment of further conditions or instructions that may eventually concern one or more other threads that also define the aircraft trajectory (according to other degrees of freedom). As used herein, the term "period" may be understood either as a strict time period, or as an interval in which another flight variable has a certain value.

Another example pattern or thread defining the aircraft trajectory is referred to as "Longitudinal Thread 2" 304, 404. With reference to FIG. 3, Longitudinal Thread 2 defines an aircraft trajectory using a series of instructions 304a, 304c concerning the air vehicle's speed and acceleration (or engine). In the illustrated example, Longitudinal Thread 2 also includes triggers 304a', 304c' and, similar to other threads, the validity of an instruction (given by its associated trigger) may be conditioned to the fulfillment of a determinate condition or instruction that may eventually concern one or more other threads.

Another example pattern or thread defining the aircraft trajectory is referred to as "Lateral Thread" 306, 406. The Lateral Thread defines an aircraft trajectory by way of establishing the coordinates in a horizontal plane over which the air vehicle must pass by, at the different stages of the flight. Coordinates are specified in the form of instructions 306a, 306c, 406a, 406c including geometrical maneuvers to guide the air vehicle towards those coordinates. Similar to the other threads, the Lateral Thread 306, 406 includes triggers 306a', 306c', 406a', 406c'. The validity of the instructions (given by their associated triggers) may be conditioned to the fulfillment of other conditions or instructions that may eventually concern one or more other threads.

Another example pattern or thread (e.g., a fourth pattern or thread) is referred to as "Configuration Thread" 308, 408. The Configuration Thread 308, 408 defines an aircraft trajectory through the specific maneuvers that a determinate air vehicle must carry on (e.g., high lift, landing gears, flaps deployment/retraction) at each stage along the flight. In some examples, the Configuration Thread 308, 408 is dependent on the type of air vehicle. As with the other threads, the Configuration Thread 308, 408 includes triggers, and the validity of the instructions associated thereto may be conditioned to the fulfillment of other conditions or instructions that may eventually concern one or more other threads.

In the illustrated example of FIG. 3, the "Longitudinal Thread 1" 302 includes a series of two instructions 302a, 302b with corresponding triggers 302a', 302b'.

FIG. 3 represents a series of instructions 304a, 304c with corresponding triggers 304a', 304c' for "Longitudinal Thread 2". As shown in FIG. 3, among the first instruction 304a and the last instruction 304c of Longitudinal Thread 2, there is a Conditional Composite 304b. The Conditional Composite 304b includes different series of instructions with corresponding triggers (two series of instructions, for the case shown in FIG. 3). The Conditional Composite 304b first evaluates the fulfillment of a certain condition 304bCON. Depending on this evaluation, one of the series of instructions including the Conditional Composite 304b becomes valid. Once the last instruction 304b1, 304b2b of the validated series of instructions ends its validity, the next instruction 304c upon the thread starts its validity. In the illustrated example of FIG. 3, one of the series of instructions including the Conditional Composite 304b includes one instruction 304b1 and one trigger 304b1', and the other series of instructions including the Conditional Composite 304b includes two instructions 304b2a, 304b2b with its corresponding two triggers 304b2a', 304b2b'. The series of instructions including the Conditional Composite 304b may either be specifically defined for the Longitudinal Thread 2, or may be series of instructions of other threads defining the aircraft trajectory (e.g., the condition 304bCON of the Conditional Composite 304b of the Longitudinal Thread 2 may invoke a series of instructions belonging to other threads).

FIG. 3 also depicts a series of instructions 306a, 306c with its corresponding triggers 306a', 306c' for the "Lateral Thread" defining the aircraft trajectory. In FIG. 3, the series of instructions for the Lateral Thread 306 includes a first instruction 306a with its corresponding trigger 306a', a First Intent Composite (Composite 1) 306b, and a last instruction 306c with its corresponding last trigger 306c'. An Intent Composite is a condensed way of expressing another series of instructions for defining the aircraft trajectory, in this case, among the first trigger 306a' and the last instruction 306c of the Lateral Thread 306.

The First Intent Composite (Composite 1) 306b in turn includes a first instruction 306ba with its corresponding first trigger 306ba', a Second Intent Composite (Composite 2) 306bb and a last instruction 306bc with its corresponding last trigger 306bc'.

The Second Intent Composite (Composite 2) 306bb is another series of instructions for defining the aircraft trajectory according to the Lateral Thread 306b, in this example, includes the first trigger 306ba' and the last instruction 306bc of the series of instructions including the First Intent Composite 306b.

The Second Intent Composite (Composite 2) 306bb in turn includes two instructions 306bba, 306bbb ordered one after the other, with its corresponding two triggers 306bba', 306bbb', the last instruction 306bbb being valid only when the first instruction 306bba ends its period of validity and the first trigger 306bba' leads into the last instruction 306bbb.

FIGS. 3 and 4 only schematically show a "Configuration Thread" 308, 408, without giving any particular detail on the series of instructions including the Configuration Thread 308, 408. However, it is understood that the "Configuration Thread" 308, 408 may include one or more instructions and corresponding triggers (and/or one or more composites (e.g., a Conditional Composite, an Intent Composite) and/or loop nodes) similar to the other threads disclosed herein.

FIG. 4 illustrates another example schematic of how an example aircraft trajectory is defined using CRAIDS. FIG. 4 is similar to FIG. 3, although "Composite 1" 306b in Lateral Thread 306 has been replaced by a "Loop node" 406b.

In the Lateral Thread 406 of FIG. 4, the first trigger 406a' establishes the end of validity of the first instruction 406a and the start of validity of the Loop node 406b (which is constituted as a Composite, i.e. it includes sets of instructions with their corresponding triggers). The Loop node 406b then evaluates whether a pre-determined main condition 406bCON (which may either be a fixed condition or a condition pertaining the actual value of a state vector (e.g., including flight variables) of the air vehicle) is fulfilled. If this main condition 406bCON is not fulfilled, the validity of the Loop node 406b ends, and the next instruction 406c (e.g., the last instruction for the Lateral Thread 406 shown in FIG. 4) of the Lateral Thread 406 starts its validity. If the Loop main condition 406bCON is fulfilled, then the first instruction 406ba of the Loop node 406b starts its validity. Once the last instruction 406bbb in the Loop node 406b ends its validity, the Loop 406b evaluates once again its condition 406bCON. If it is still fulfilled, the first instruction 406ba in the Loop node 406b starts its validity; and if the condition 406bCON is not fulfilled, the validity of the Loop node 406b ends.

In the illustrated example, the Loop node 406b in the Lateral Thread 406 of FIG. 4 is constituted as a composite. The Loop node 406b includes a series of two instructions 406ba, 406bc with their corresponding two triggers 406ba', 406bc', and it includes another composite node 406bb between the first trigger 406ba' and the last instruction 406bc. In the illustrated example, the composite 406bb includes a series of two instructions 406bba, 406bbb with their corresponding triggers 406bba', 406bbb'.

According to CRAIDS, the instructions and triggers included in the Threads, which define the example aircraft trajectory, can be created, deleted and/or modified, according to user preferences, constraints given and/or any other criteria.

As can be appreciated, the structure of the trajectory definition given by CRAIDS represents a hierarchical tree, in which the different threads defining the aircraft trajectory are at the same level, and the Composite Nodes, Loop Nodes and/or Conditional Composite Nodes lead to subordinate series of instructions that are at a lower level, thus constituting child nodes.

In some examples the Composites (Composite Nodes) are expressed in a relatively condensed manner because they express groups of instructions that are closely related (e.g., instructions that are intended to perform a particular task such as landing approaches).

Whenever a user (e.g., an AI Consumer) wants to delete a particular condition or composite (e.g., the user wants to avoid a particular task from being performed within a particular thread), the deletion automatically propagates downwards along the child nodes of the hierarchical tree. In other words, all the series of instructions pending from a deleted node are to be deleted too, such that all the instructions defining or particularizing a deleted Composite, Conditional Composite and/or Loop are also deleted.

The example air vehicle navigation methods disclosed herein may be implemented by the navigation system 100, which may be implemented using a computer storing the example aircraft trajectories defined in AIDL by CRAIDS. The computer (e.g., the navigation system 100) enables a user who accesses the computer, to partially or totally create, modify and/or delete an aircraft trajectory. The aircraft trajectory (e.g., as represented in FIG. 3 or 4) may be displayed via the computer to the user.

Figure 5A:
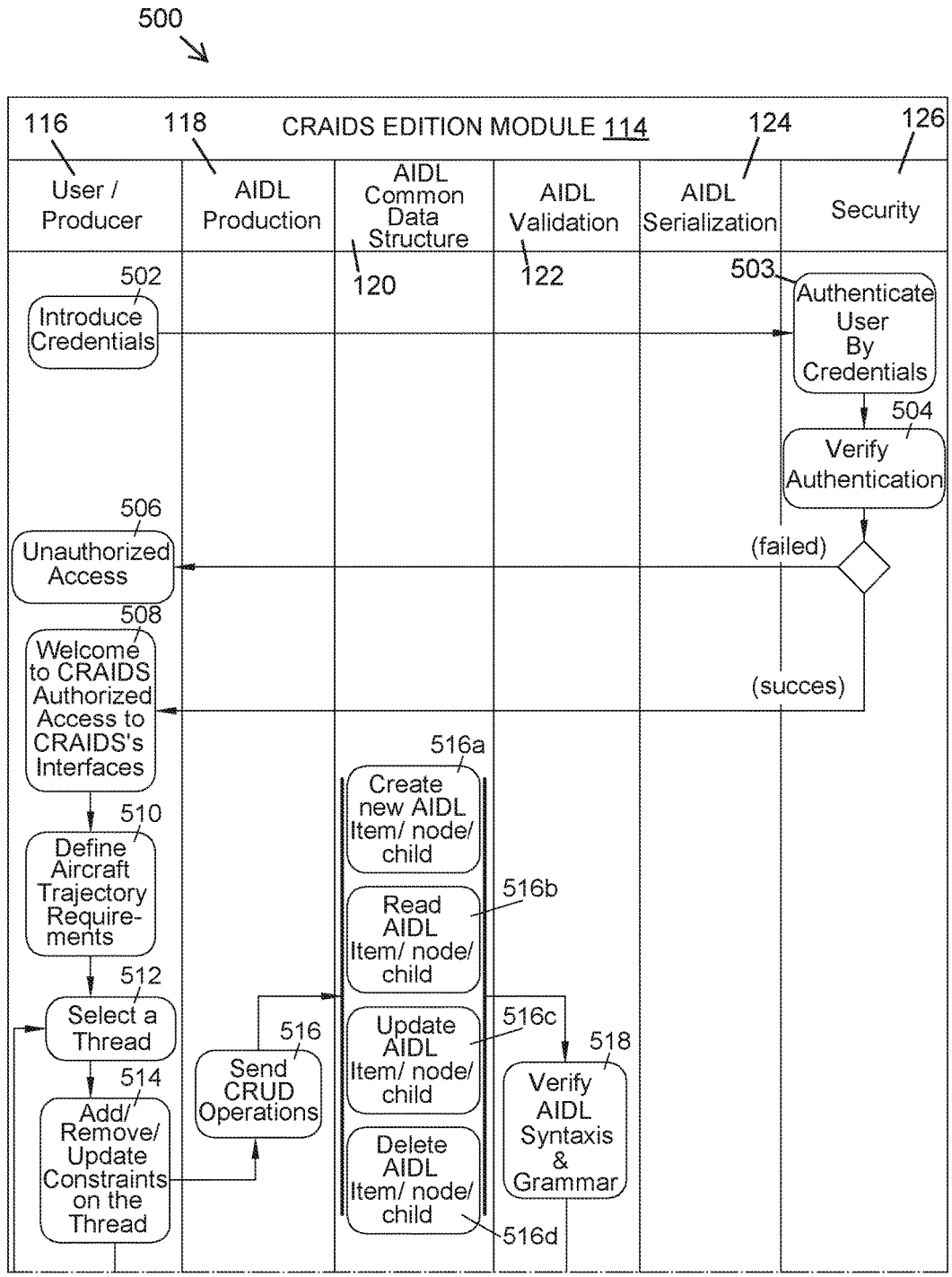
FIGS. 5A-5C depict an example sequence diagram representative of an example method implemented by the example navigation system of FIG. 1 to edit a trajectory making use of CRAIDS.
Figure 5B:
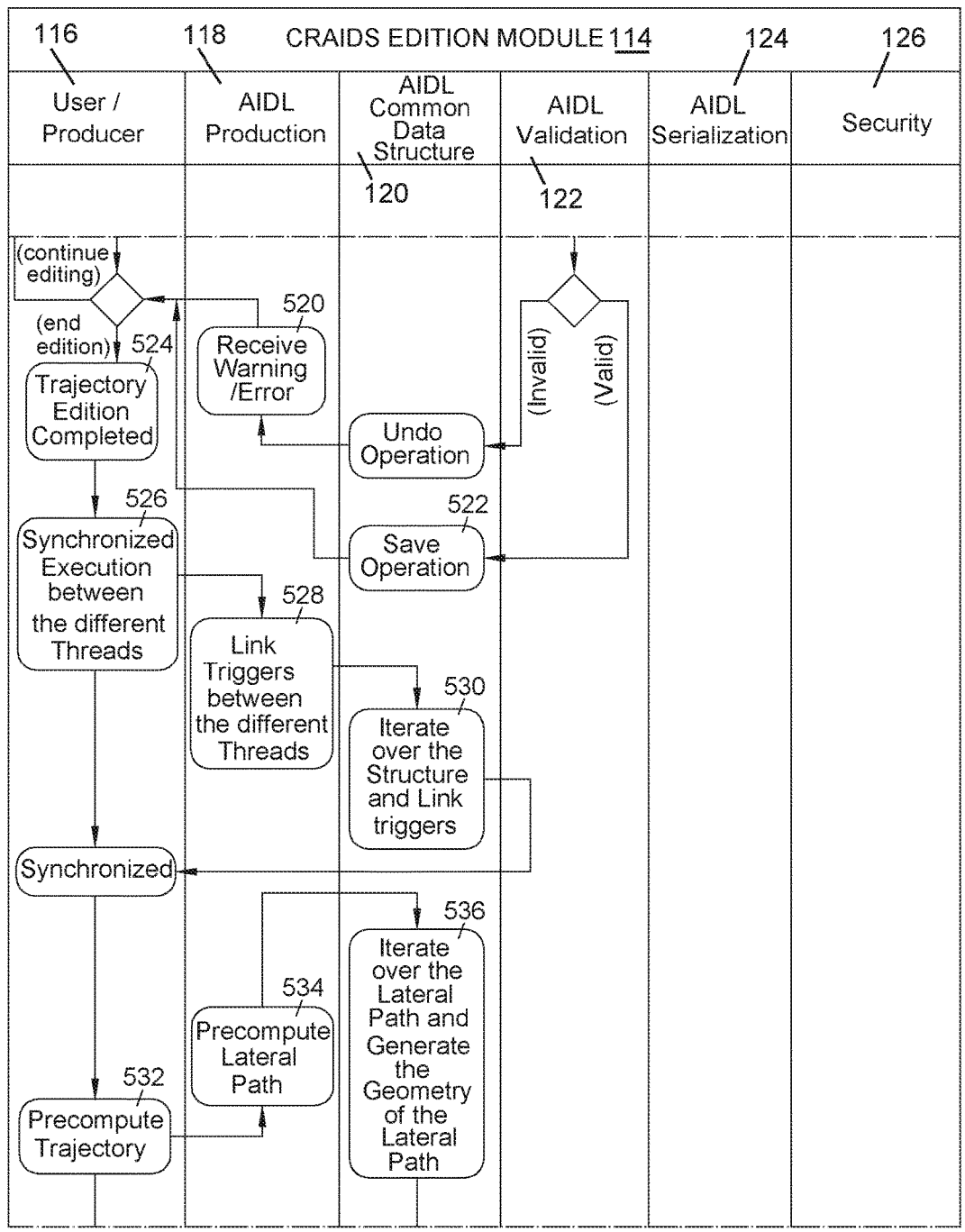
Figure 5C:
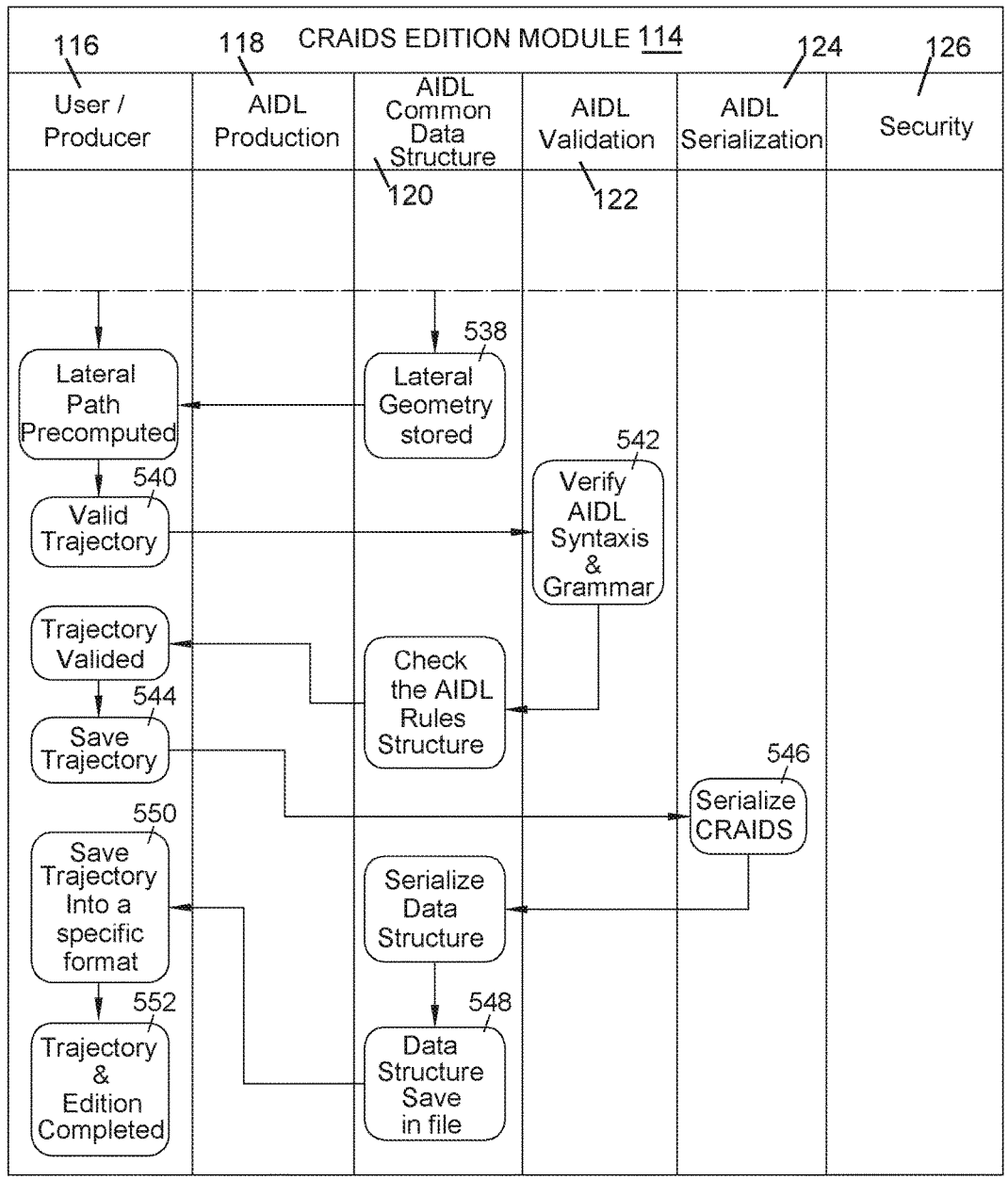

FIGS. 5A-5C are a sequence diagram illustrating an example method 500 to create and/or modify an example aircraft trajectory using CRAIDS. The example method 500 is implemented by the example CRAIDS edition module 114 of the example navigation system 100 (FIG. 1) as desired by a user to create and/or modify an aircraft trajectory, making use of CRAIDS. The user accesses the CRAIDS edition module 114, the module being implemented on a computer (e.g., the example navigation system 100) implementing the present method. The example CRAIDS edition module 114, as illustrated in FIGS. 1 and 5A-5C, includes the User/Producer Interface 116, the AIDL Production Interface 118, the AIDL Common Data Structure (CRAIDS) interface 120, the AIDL validation interface 122, the AIDL serialization interface 124 and the Security interface 126. In the illustrated example of FIG. 5A, a user introduces in the User/Producer interface 116 his/her credentials 502 (code or password) to access the CRAIDS edition module 114. The Security interface 126 authenticates 503 the user based on the credentials.

After verifying 504 the user's credentials, the Security interface 126 either rejects the user 506 (e.g., by sending an Unauthorized Access message to be displayed on the User/Producer interface 116) if the user's credentials do not correspond to an authorized user, or accepts the user 508 (e.g., by sending an Authorized Access message be displayed on the User/Producer interface 116) if the user's credentials do correspond to an authorized user.

If the user has successfully accessed the CRAIDS edition module 114, the User/Producer Interface 116 requests the user to introduce one or more trajectory requirement(s) 510 (e.g., the user is asked to indicate whether he/she wishes to modify altitudes, waypoints, aircraft configuration values, etc.). This trajectory definition 510 may correspond to, for example, the Definition of Aircraft trajectory requirements 202 of FIG. 2.

After being asked to introduce the trajectory requirement(s), the trajectory requirement(s) are introduced by selecting a thread 512 (e.g., a particular degree of freedom) for starting with aircraft trajectory edition.

After selecting a thread, the user is asked (e.g., via the User/Producer Interface 116) to introduce one or more flight constraints 514 (e.g., values) regarding the trajectory requirement(s). For example, referring to FIG. 3, the user may select Longitudinal Thread 1 and indicate that the altitude of the flight at a precise along-track distance throughout the flight should be restricted among two values, or should be restricted to a specified value.

The AIDL Production interface 118 modifies 516 the selected thread that defines the aircraft trajectory according to user's instructions (e.g., based on the constraints introduced by the user). In the illustrated example of FIG. 5A, the selected thread is modified by a set of operations referred to as CRUD operations (Create 516a, Read 516b, Update 516c, Delete 516d), which modify, delete and/or create items/nodes/child nodes (instructions, triggers, composites, conditional composites, loops) in the hierarchical tree with which CRAIDS defines aircraft trajectories. If a constraint introduced by the user involves deleting a node, all the child nodes depending from the previous (deleted) node are also deleted. After making the CRUD operations within a particular thread, the AIDL validation interface 122 verifies the syntax and grammar rules 518 concerning AIDL. The AIDL validation interface 122 assesses whether the set of instructions making up the selected thread, as a whole, logical and satisfy aircraft performance restrictions and flight policies set as a rule in AIDL description language for a particular air vehicle and/or for a particular flight/type of flight. Referring to FIG. 5B, if the syntax/grammar rules are not complied with, a warning message is displayed 520 and the user must then select again a thread 512 (in this case, the user must select again the same thread to overcome syntax/grammar deficiencies) for adding/removing constraints.

After the user has selected a thread into which he/she wants to make modification(s), and once all modification(s) have been performed and the syntax/grammar has been verified and approved, the AIDL common data structure interface 120 saves the operation 522 in a file (e.g., saving the changes made in the selected thread). In some examples, the file is saved to the database 144 of FIG. 1.

Once the user has finished 524 editing the threads into which he/she wants to make modifications, the user is asked (e.g., via the User/Producer interface 116) to introduce one or more synchronization requirements 526 (if any), indicating times and/or conditions that may link the periods of validity of different instructions among different threads. The AIDL production interface 118 links triggers 528 among threads according to the user's instructions and the AIDL data structure interface 120 iterates over the whole CRAIDS structure 530 linking those triggers that are to be linked (e.g., synchronized) as a consequence of the user's instructions.

In the illustrated example of FIG. 5B, the User/Producer interface 116 asks the user whether he/she desires to pre-compute a trajectory/partial trajectory 532 according to the trajectory defined by the given constraints and instructions. If the user instructs so, the trajectory/partial trajectory is pre-computed 534 (Pre-compute Lateral Path) by the AIDL Production interface 118. The AIDL common data structure 120 iterates over the Lateral Thread/Path and generates the geometry of the lateral path (horizontal path) of the trajectory 536 derived from the Lateral Thread. Referring to FIG. 5C, the AIDL common data structure interface 120 stores in a file the generated lateral path 538 and showing it in a display (e.g., via the User/Producer interface 116) to the user. The filed may be stored in the database 144 of FIG. 1, for example.

If the user is satisfied with the generated trajectory, the User/Producer interface 116 asks the user to validate the generated trajectory 540, which enables the AIDL validation interface 122 to verify 542 whether the generated trajectory defined in AIDL using CRAIDS (according to constraints and instructions given by the user), as a whole, complies with AIDL grammar and syntax rules. If the generated trajectory complies with grammar and syntax rules, the User/Producer interfaces 116 asks the user whether he/she wants to save in a file the generated aircraft trajectory 544. The file may be saved in the database 144 of FIG. 1, for example. If the user instructs to save the generated trajectory, the AIDL serialization interface 124 generates a serialization 546 of the CRAIDS instructions and triggers defining the aircraft trajectory, and the AIDL common data structure interface 120 saves the serialized CRAIDS instructions into a file 548 (e.g., saved in the database 144 of FIG. 1). The User/Producer interface 126 asks the user whether he/she wants to save the serialized CRAIDS into a specific format 550, and applying the mentioned format to the saved file, thus finishing the editing operations 552. This serialization enables the hierarchical tree to be re-built and displayed to the user whenever the user opens the file where the CRAIDS structure has been saved.

In some examples, the triggers assess Boolean conditions to determine whether the instruction to which a trigger is associated is valid. In some examples, these Boolean conditions pertain to flight variables of the air vehicle's state vector (e.g., altitude, speed, acceleration, etc.). For example, a determinate first Boolean condition may relate to an air vehicle's altitude being higher or lower than 1,000 m (h>1,000 m). Thus, if the updated state vector of the air vehicle indicates that the air vehicle's altitude is over 1,000 m, the first Boolean condition is TRUE, and a first trigger assessing the first Boolean condition would indicate (e.g., by generating a signal) that the assessed first Boolean condition is TRUE. Any other component or trigger linked to the first trigger would then receive the signal from the first trigger. Therefore, the first trigger and the triggers linked thereto determine that the instructions associated to them have ended their period of validity, and the next instructions (following those triggers) in each thread start their validity.

In some examples, multiple triggers are linked to one another, within a determinate Thread, or among different Threads. In some examples, to link triggers, the active object (the trigger to which many others are linked or subscripted) has a Boolean condition associated to a flight variable indicated in the air vehicle's state vector. The passive objects (the triggers linked to the active object) apply for a link to the active object. As an example, assume that there is one active object (Trigger 1) and two passive objects (Trigger 2 and Trigger 3). Trigger 2 and Trigger 3 apply for a link to Trigger 1. Trigger 1 accepts the petition of Trigger 2 and Trigger 3 and stores in a list the identifiers and references of Trigger 2 and Trigger 3. In some examples, triggers are linked by the AIDL production interface 118 according to the user's instructions. Whenever Trigger 1 assesses that the Boolean condition to which it is associated is TRUE, Trigger 1 goes through the stored list of linked triggers and communicates to them the TRUE assessment via a signal.

Similarly, the linked triggers (Trigger 2 and Trigger 3) also assess that their respective conditions are TRUE, and also activate their corresponding signals. This way, the assessment of a Boolean condition associated to a determinate flight variable may propagate through the entire CRAIDS hierarchical tree, activating different triggers that lead to the start of validity of different instructions in one or more threads.

In some examples, there are 6 maximum threads (6 maximum degrees of freedom) defining the aircraft's motion and, thus, the aircraft's trajectory.

Some example methods include pre-computing a partial trajectory of the Lateral Thread (which mainly define geometric instructions as straight or curved lines to follow a trajectory). This trajectory pre-computation results in considerable time saving because an a priori knowledge is obtained of how an aircraft trajectory looks.

An example trajectory computation/pre-computation algorithm includes searching the Lateral Thread for those instructions that only define a geometry (e.g., Lateral Path Law, LPL), and copying those instructions in a list. If a Hold Course instruction (a Hold Course instruction is a discontinuity that holds the current aircraft's course until its validity ends, the validity of which may depend on another air vehicle's flight variable) is found among two instructions in the Lateral Thread, then the discontinuity is marked on the generated/computed partial trajectory using a tag. If a bifurcation (a Conditional Composite) is found within the Lateral Thread, a new list is created with the purpose of keeping two alternative lists representing the bifurcation. The result is an ensemble of lists where only geometric instructions are kept.

Once the lists containing only geometric instructions are created, the example algorithm reviews the lists and solves the geometric issues associated to the instructions, thus creating and depicting the different geometric objects. The geometric objects define a succession of spots defining, in a horizontal plane, the waypoints along which the aircraft is to fly. In some examples, the geometric objects are stored in a different list constituting the computed Lateral Path.

Each element upon the Lateral Path (which represents a geometric object and therefore a trajectory segment) is associated to its corresponding instruction. As a result of this association, the different systems making use of CRAIDS may further compute/execute a geometric instruction accessing its corresponding geometric object for which a geometric solution has already been solved.

FIGS. 6A-6D are a sequence diagram illustrating an example method 600 to execute or use an example aircraft trajectory, such as an aircraft trajectory created and/or modified using the example method 500 of FIGS. 5A-5C, and making use of CRAIDS. The example method 600 is implemented by the example CRAIDS consumption module 128 of the example navigation system 100 (FIG. 1). The user/consumer accesses the CRAIDS consumption module 128, the module being installed in a computer (e.g., the example navigation system 100) implementing the present method. The example CRAIDS consumption module 128, as illustrated in FIGS. 1 and 6A-6D, includes the User/Consumer interface 130, the AIDL Production interface 132, the Runtime Trajectory Computation interface 134, the AIDL Common Data Structure (CRAIDS) interface 136, the AIDL validation interface 138, the AIDL Serialization interface 140 and the Security interface 142. In the illustrated example, the User/Consumer interface 130 may be a trajectory predictor or a flight control, for example.

Figure 6A:
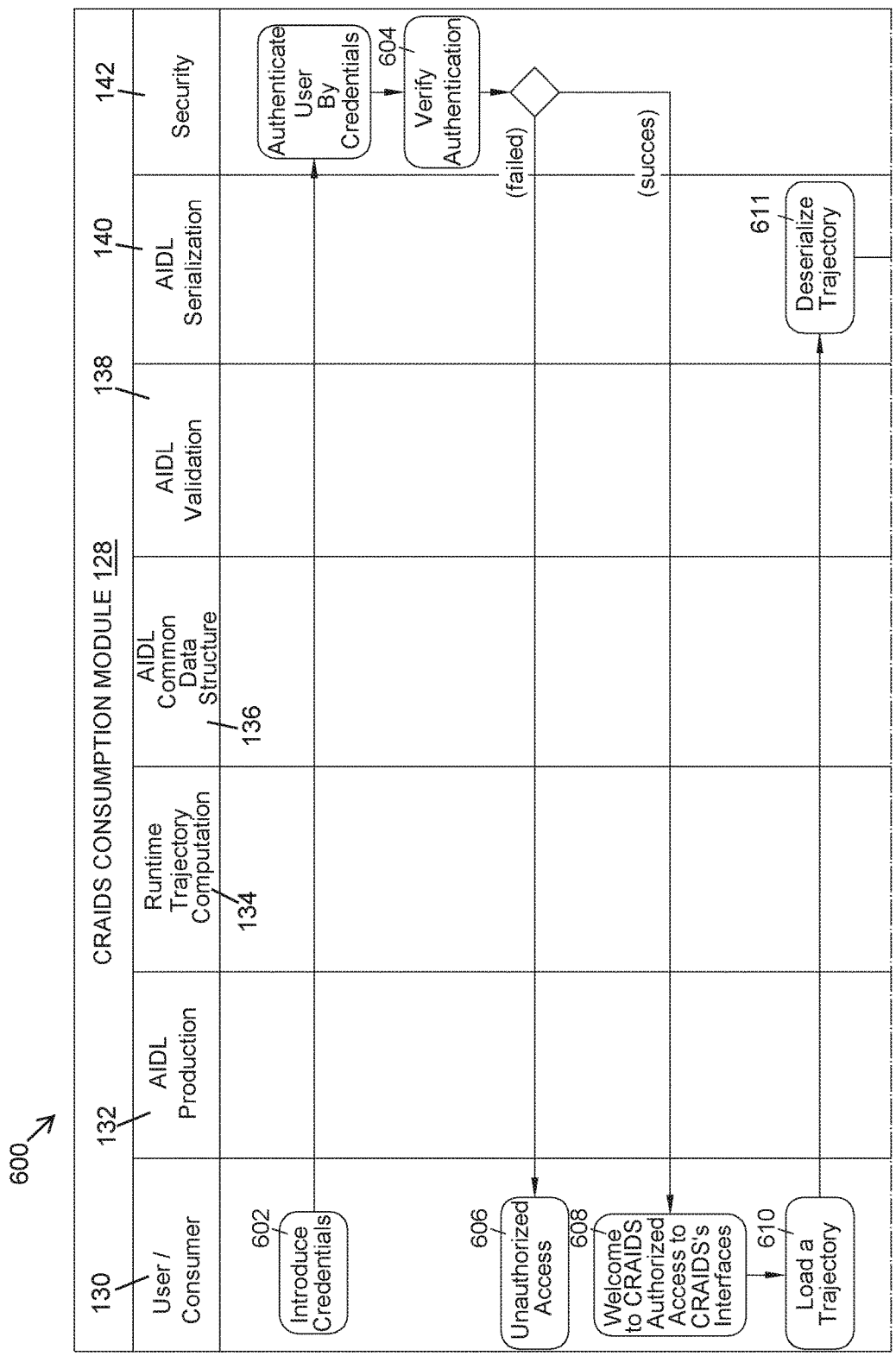
FIGS. 6A-6D depict an example sequence diagram representative of an example method implemented by the example navigation system of FIG. 1 in the process of flying an air vehicle departing from an aircraft trajectory that has been defined in AIDL and edited taking advantage of CRAIDS.

In the illustrated example of FIG. 6A, the user introduces in the User/Producer interface 130 his/her credentials 602 (code or password) to access the CRAIDS consumption module 128. The Security interface 142 authenticates 603 the user based on the credentials. After verifying the user's credentials 604, the Security interface 142 either rejects the user 606 (e.g., by sending an Unauthorized Access message to be displayed on the User/Producer interface 130) if the user's credentials do not correspond to an authorized user, or accepts the user 608 (e.g., by sending an Authorized Access message to be displayed on the User/Producer interface 130) if the user's credentials do correspond to an authorized user.

If the user has successfully accessed the CRAIDS consumption module 128, the User/Consumer interface 130 requests the user to select a trajectory based on AIDL description language, and load 610 the trajectory in the computer's memory 610 (e.g., in the database 144 (FIG. 1). For example, the user may select a file where a serialized aircraft trajectory has been saved. The trajectory and AIDL data structure is deserialized for it to be loaded in computer memory. In particular, the AIDL Serialization interface 140 deserializes 611 the trajectory and the AIDL common data structure interface 136 deserializes 612 the AIDL data structure and stores 613 the data structure in the computer memory, as illustrated in FIGS. 6A and 6B.

Figure 6B:
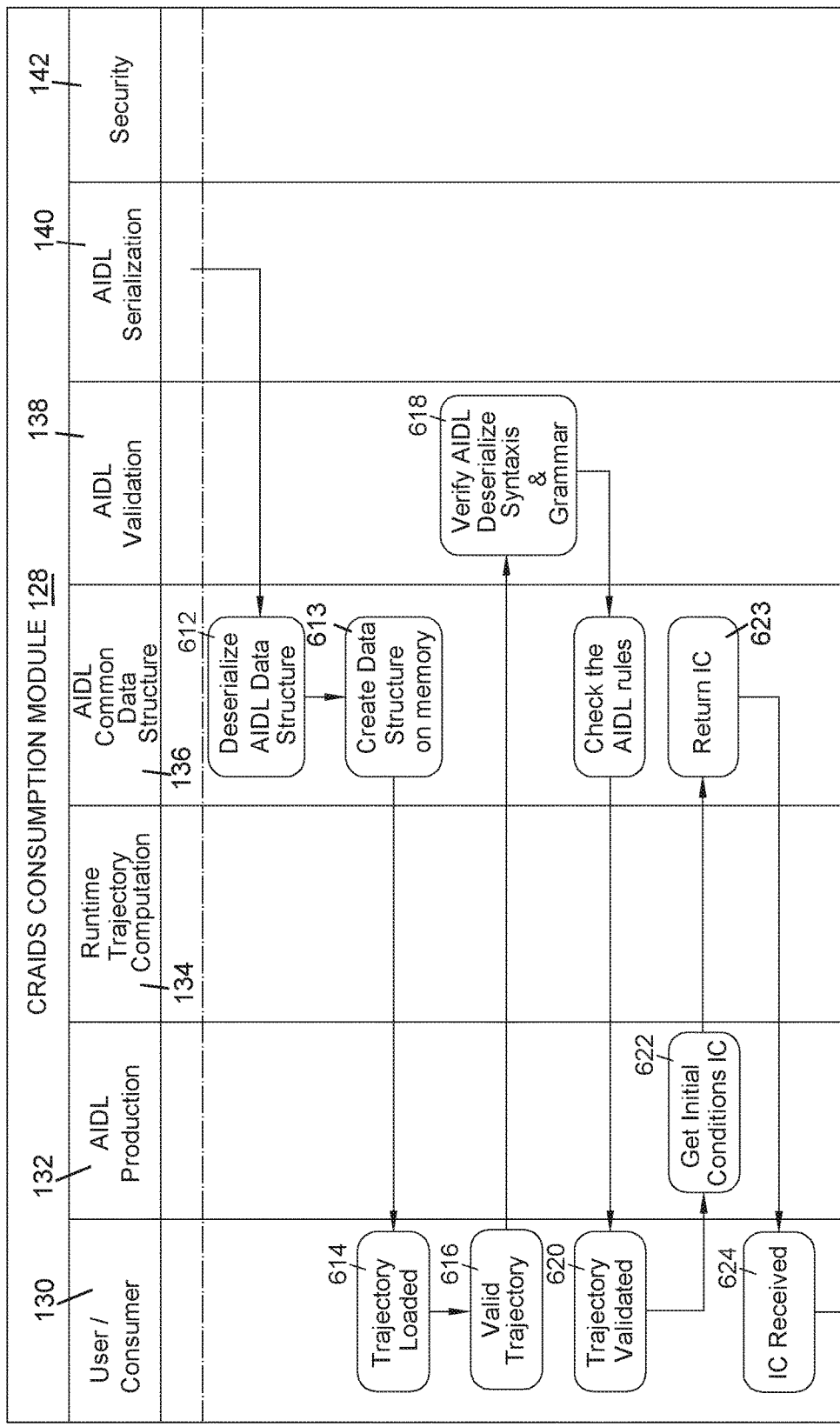

Referring to FIG. 6B, once the selected trajectory has been loaded in the computer memory 614 (e.g., in the User/Consumer interface 130), the user is asked to start validation of the trajectory 616 and the AIDL validation interface 138 validates (e.g., verifies) syntax and grammar of the AIDL language 618. The AIDL validation interface 138 verifies whether the instructions defining the aircraft's trajectory are logical, and there are no missing instructions for completely defining the trajectory. The AIDL common data structure 136 checks 619 the AIDL rules. With the trajectory validated 620 and loaded in the computer memory, different consumption systems or modules (such as Trajectory Prediction (TP) or Flight Control (FC)) may compute/pre-compute the resulting trajectory, by accessing the Runtime Trajectory Computation (RTC) interface 134.

Figure 6C:
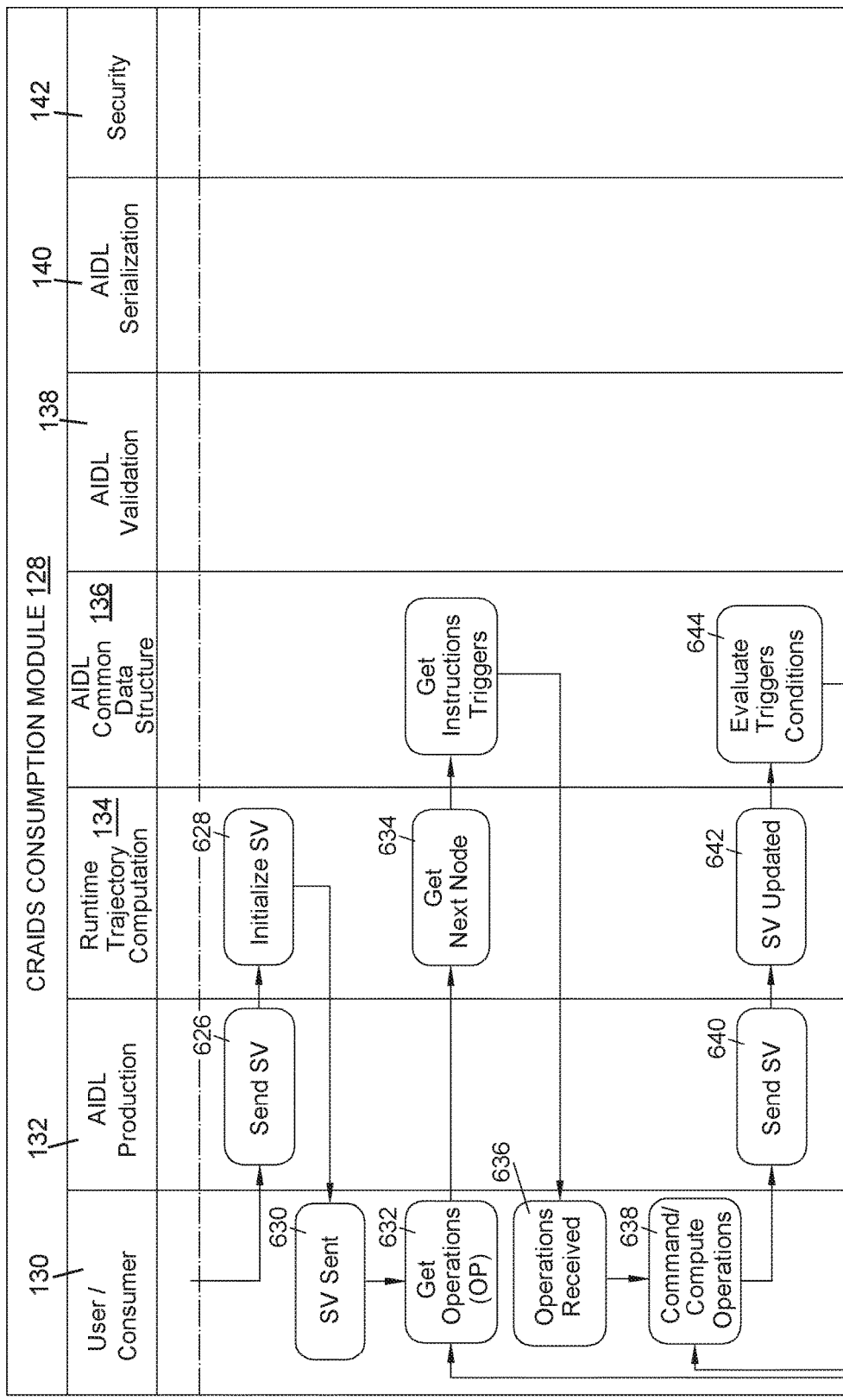

The AIDL production interface 132 solicits 622 the initial conditions for a flight, which are returned 623 by the AIDL Common data structure interface 136 and received 624 by the User/Consumer interface 130. As illustrated in FIG. 6C, the AIDL production interface 132 in turn sends a request 626 to receive the updated state vector with the current values of the air vehicle to the CRAIDS consumption module 128. The state vector is then initialized 628 by the Runtime Trajectory Computation interface 134 and sent 630 to the User/Consumer interface 130. The user then makes a request to get the operations necessary to perform the loaded trajectory 632. The Runtime Trajectory Computation interface 134 through the CRAIDS hierarchical tree structure getting the next nodes 634 including instructions and triggers that, as a whole, constitute the different operations to be performed by an air vehicle so that the air vehicle follows a trajectory.

Once the user/consumer system has received the operations 636, the User/Consumer interface 130 starts the computation of a trajectory and/or it commands 638 the air vehicle to perform the received operations so as to follow the trajectory specified by CRAIDS (depending on the type of consumer system or module, it respectively computes a trajectory—Trajectory Prediction module, TP- or commands—Flight Control module, FC— the air vehicle). Whether the CRAIDS consumption module 128 computes a trajectory or commands the air vehicle to follow a trajectory, the AIDL production interface 132 sends the updated values of the state vector 640 of the air vehicle to the CRAIDS consumption module 128, while the ongoing operation is being executed. Once the Runtime Trajectory computation interface 134 updates the air vehicle's state vector 642, the AIDL common data structure interface 136 evaluates the conditions 644 associated to the nodes of the CRAIDS hierarchical tree (triggers and conditional nodes or loop nodes). If any trigger within a particular thread defining the aircraft trajectory has been reached 645 (see FIG. 6D) (as determined by the Runtime Trajectory Computation interface 134), then the CRAIDS consumption module 128 evaluates 647 (e.g., via the Runtime Trajectory computation interface 134) whether that particular thread has ended. If no trigger has been reached, the User/Consumer interface 130 keeps executing/computing the ongoing operation 649.

Figure 6D:
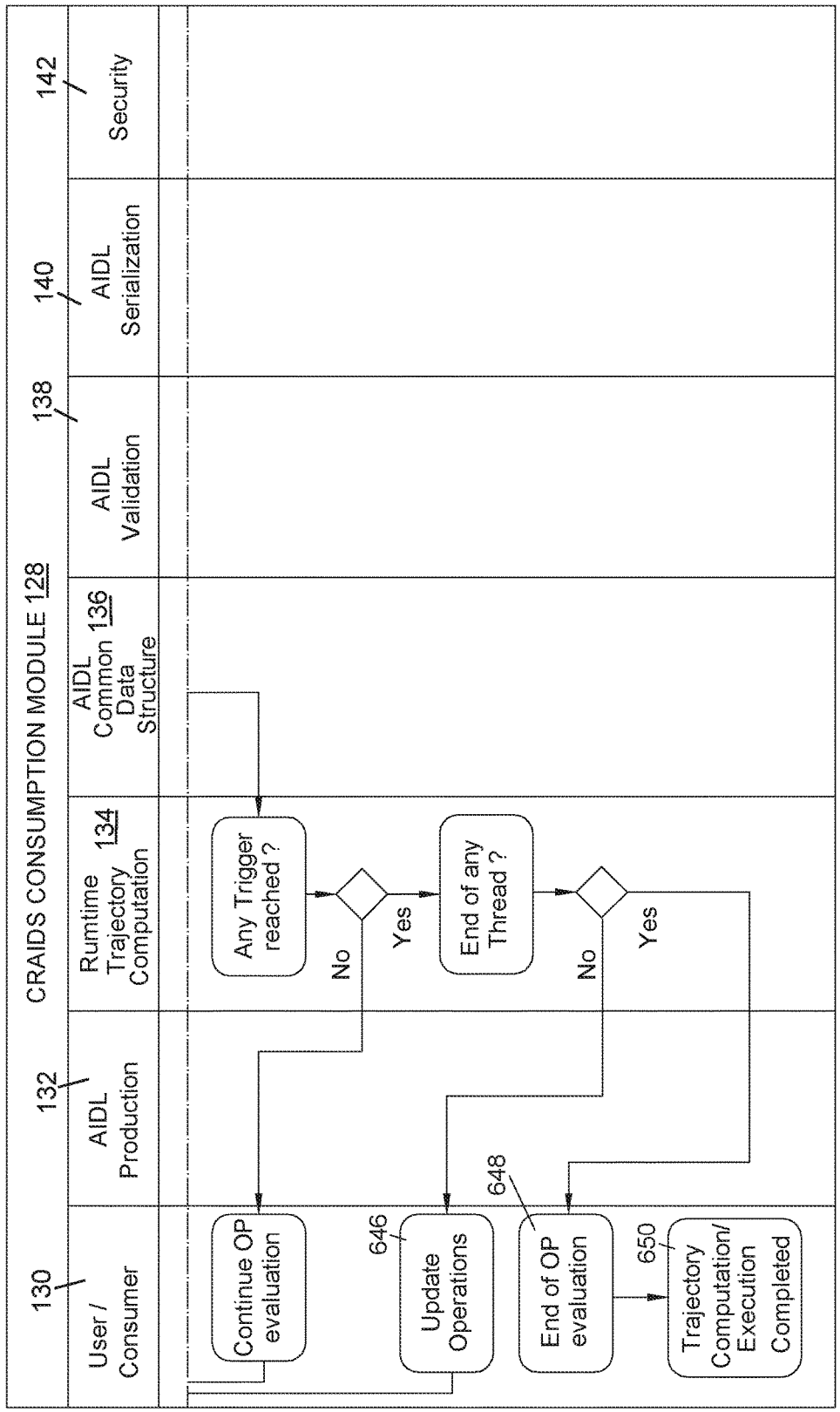

If a trigger is reached within any of the threads defining the aircraft trajectory, but it is still not the end of that particular thread, the User/Consumer interface 130 updates the ongoing operations 646 and makes a new request 632 (FIG. 6C) to get new operations. Referring to FIG. 6D, if the reached trigger is at the end of a particular thread, then the CRAIDS consumption module 128 sends to the User/Consumer interface 130 an end of evaluation message 648, and the trajectory computation and/or execution is completed 650.

Figure 7:
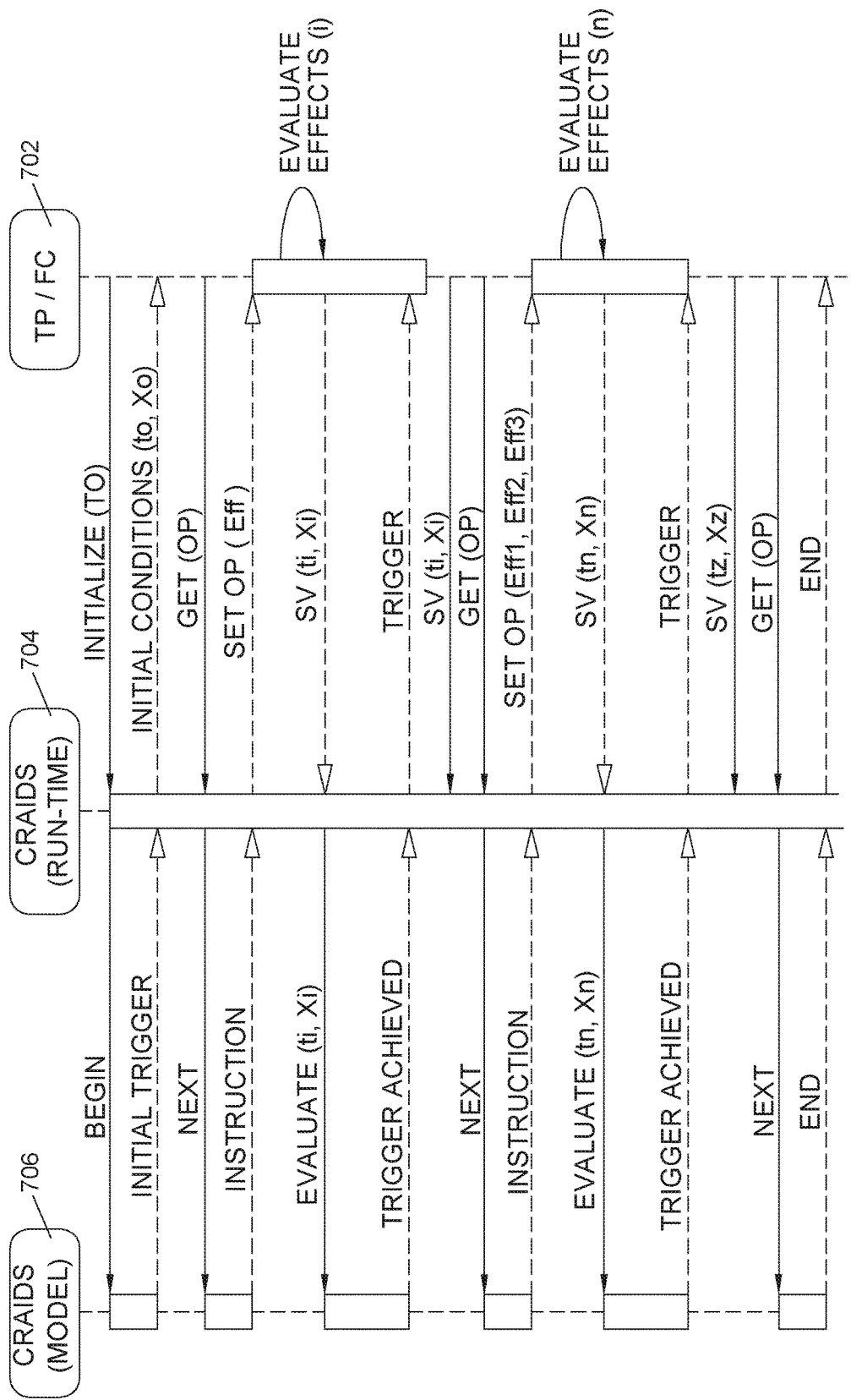
FIG. 7 is an example sequence diagram illustrating an example method implemented by the example navigation system of FIG. 1 in the computation process of an aircraft trajectory edited in CRAIDS.

FIG. 7 depicts an example sequence diagram of an example method 700. The example method 700 includes example events involved in the computation/execution process of an aircraft trajectory between an example Flight Control/Trajectory Prediction (FC/TP) system 702 and an example CRAIDS system 704 according to an example CRAIDS Model 706 of a particular trajectory. The TP/FC system 702 may correspond to one or more of the AI consumers of FIG. 1 and/or the User/Consumer interface 130 of FIG. 1, for example. The CRAIDS system 704 may correspond to the example navigation system 100 of FIG. 1. The example method 700 includes the following events:

1. The FC/TP system 702 asks the CRAIDS system 704 (e.g., CRAIDS Runtime or Runtime Trajectory Computation, RTC 134 (FIG. 1)) for the initial conditions of the air vehicle (e.g., initial conditions at initial time $t_0$ and location vector $\vec{x}_0$), according to the CRAIDS Model 706 of the particular trajectory. The FC/TP system 702 initializes and updates the initial conditions with the values given by CRAIDS system 704.
2. The FC/TP system 702 updates an air vehicle's state vector (SV) with the initial conditions given by CRAIDS system 704, and sends the state vector to the CRAIDS system 704. The CRAIDS system 704 initializes its internal state vector, according to the state vector values provided by FC/TP system 702.
3. The FC/TP system 702 asks the CRAIDS system 704 for the first active (valid) operation (OP), which include the active (valid) instructions for each of the threads defining all the degrees of freedom of the air vehicle. With the ensemble of active instructions, the FC/TP system 702 receives the different applicable effects (e.g., one effect, "Eff", for each degree of freedom—thread—for the aircraft), which unequivocally define the aircraft's flight intent and the aircraft's trajectory.
4. The CRAIDS system 704 the petition from FC/TP system 701 and searches along each thread of CRAIDS hierarchical tree, which are the first/next nodes. For this purpose, the CRAIDS system 704 has one iterating pointer for each thread that keeps the location of the node to which it points. The iterating pointer moves forward along each thread, as it receives new petitions from the FC/TP system 702, and keeps the location of the last node it has been asked for.
   a. If the node is an instruction, the instruction is copied, together with its associated trigger, to conform an active operation. The iterating pointer then moves forward to the next node in the thread, e.g., the next trigger.
   b. If the node is a Composite, the iterating pointer moves forward until it reaches the next instruction, and the same actions described in previous item "a" are performed.
   c. If the node is a bifurcation (Conditional Composite), the CRAIDS system 704 evaluates its associated Boolean condition and, depending on whether it is TRUE or FALSE, the iterating pointer moves forward along either branch of the bifurcation, until it reaches the first instruction in that branch. Then, the same actions described in previous item "a" are performed.
   d. If the node is a Loop, the Boolean condition associated to the Loop is assessed first. If the result of this assessment is TRUE, the iterating pointer jumps into the Loop searching for the first instruction, and the actions described in item "a" are performed. If the pointer is already inside a Loop and reaches the last node of the Loop, the Boolean condition associated to the Loop is assessed again, to determine whether the Loop must be re-initialized or the pointer may jump out from the Loop, searching for the next node in the thread.

At the end of these operations, the CRAIDS system 704 has obtained a set of instructions with their associated triggers. For the FC/TP system 702 (e.g., an external system), the data structure provided by the CRAIDS system 704 is linear. As such, the FC/TP system 702 interprets the CRAIDS as a temporal succession of operations. As a result, the complexity of the CRAIDS, with its composites, loops and bifurcations, remains hidden to the FC/TP system 702. The FC/TP system 702 is only aware of a linear list of commands representing operations to be performed by the air vehicle.

5. The CRAIDS system 704 outputs a set of active operations with their associated effects (set OP(Eff1, Eff2, Eff3, . . . )) to the FC/TP system 702. The FC/TP system 702 starts to compute/command said operations in a continuous manner, until the FC/TP system 702 receives a communication from the CRAIDS system 704 that an instruction conforming an operation is no longer valid, which is indicated by the signal of the trigger associated to that instruction. While the operations and their associated effects are being performed, the FC/TP system 702 continuously updates the air vehicle's state vector at different times and location vectors, $SV(t_i, \vec{x}_i)$ and sends it to the CRAIDS system 704. The air vehicle's state vector is important, since most of the conditions (and the triggers, which can be regarded as condition assessors) base their assessment on the values taken by the flight variables in the state vector.
6. The CRAIDS system 704 updates its state vector and evaluates the conditions of the active triggers (the triggers to which the iterating pointers are pointing at each moment) to assess the validity of an instruction.
7. If the FC/TP system 702 is informed that the condition of one of the triggers is fulfilled, then the FC/TP system 702 asks again the CRAIDS system 704 for a next operation (and the actions described in previous item 4 are performed once again). Otherwise, the FC/TP system 702 continues assessing the ongoing operations (previous item 5) and updating the air vehicle's state vector at different times and locations (SV($t_n$, $x_n$)).

8. Once the end of a thread is reached, and the condition of the trigger associated to the last instruction in the thread is fulfilled, the CRAIDS system 704 cannot provide further instructions to the FC/TP system 702, so the computation/pre-computation/execution process ends.

As a result of the computation process, the FC has executed/commanded a trajectory, and the TP has predicted another trajectory. The two main trajectory consumers, the TP (whose aim is to predict a trajectory in the course of flight planning for Air Traffic Management—ATM—) and the FC (Flight Control, whose aim is execute and command the air vehicle to follow a trajectory) interact with the CRAIDS system 704 for interpreting AIDL description language as a linear succession of effects over the air vehicle (instructions) and conditions (triggers) that activate the end of the effect and specify the period of validity of such effects.

Example methods disclosed herein may be implemented by a computer (e.g., disclosed in connection with FIG. 8) associated with a conventional flight simulator. In turn, the computer may include a processor and a memory for a computer program, that when executed causes the processor to operate in accordance with the methods described herein. The computer program may also be embodied in a computer readable medium having stored therein the computer program.

While an example manner of implementing the navigation system 100 is illustrated in FIG. 1, one or more of the elements, processes and/or devices illustrated in FIG. 1 may be combined, divided, re-arranged, omitted, eliminated and/or implemented in any other way. Further, the example CRAIDS edition module 114, the example User/Producer interface 116, the example AIDL production interface 118, the example AIDL common data structure interface 120, the example AIDL validation interface 122, the example AIDL serialization interface 124, the example security interface 126, the example CRAIDS consumption module 128, the example User/Consumer interface 130, the example AIDL production interface 132, the example runtime trajectory computation interface 134, the example AIDL common data structure interface 136, the example AIDL validation interface 138, the example serialization interface 140, the example security interface 142, the example database 144 and/or, more generally, the example navigation system 100 of FIG. 1 may be implemented by hardware, software, firmware and/or any combination of hardware, software and/or firmware. Thus, for example, any of the example CRAIDS edition module 114, the example User/Producer interface 116, the example AIDL production interface 118, the example AIDL common data structure interface 120, the example AIDL validation interface 122, the example AIDL serialization interface 124, the example security interface 126, the example CRAIDS consumption module 128, the example User/Consumer interface 130, the example AIDL production interface 132, the example runtime trajectory computation interface 134, the example AIDL common data structure interface 136, the example AIDL validation interface 138, the example serialization interface 140, the example security interface 142, the example database 144 and/or, more generally, the example navigation system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example CRAIDS edition module 114, the example User/Producer interface 116, the example AIDL production interface 118, the example AIDL common data structure interface 120, the example AIDL validation interface 122, the example AIDL serialization interface 124, the example security interface 126, the example CRAIDS consumption module 128, the example User/Consumer interface 130, the example AIDL production interface 132, the example runtime trajectory computation interface 134, the example AIDL common data structure interface 136, the example AIDL validation interface 138, the example serialization interface 140, the example security interface 142 and/or the example database 144 is/are hereby expressly defined to include a tangible computer readable storage device or storage disk such as a memory, a digital versatile disk (DVD), a compact disk (CD), a Blu-ray disk, etc. storing the software and/or firmware. Further still, the example navigation system 100 of FIG. 1 may include one or more elements, processes and/or devices in addition to, or instead of, those illustrated in FIG. 1, and/or may include more than one of any or all of the illustrated elements, processes and devices.

Flowcharts representative of the example methods 200, 500, 600, 700 for implementing the navigation system 100 are shown in FIGS. 2, 5A-5C, 6A-6D and 7. In these examples, the methods 200, 500, 600, 700 may be implemented by machine readable instructions that comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 2, 5A-5C, 6A-6D and 7, many other methods of implementing the example navigation system 100 may alternatively be used. For example, the order of execution of the blocks may be changed, and/or some of the blocks described may be changed, eliminated, or combined.

As mentioned above, the example methods of FIGS. 2, 5A-5C, 6A-6D and 7, may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 2, 5A-5C, 6A-6D and 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 8:
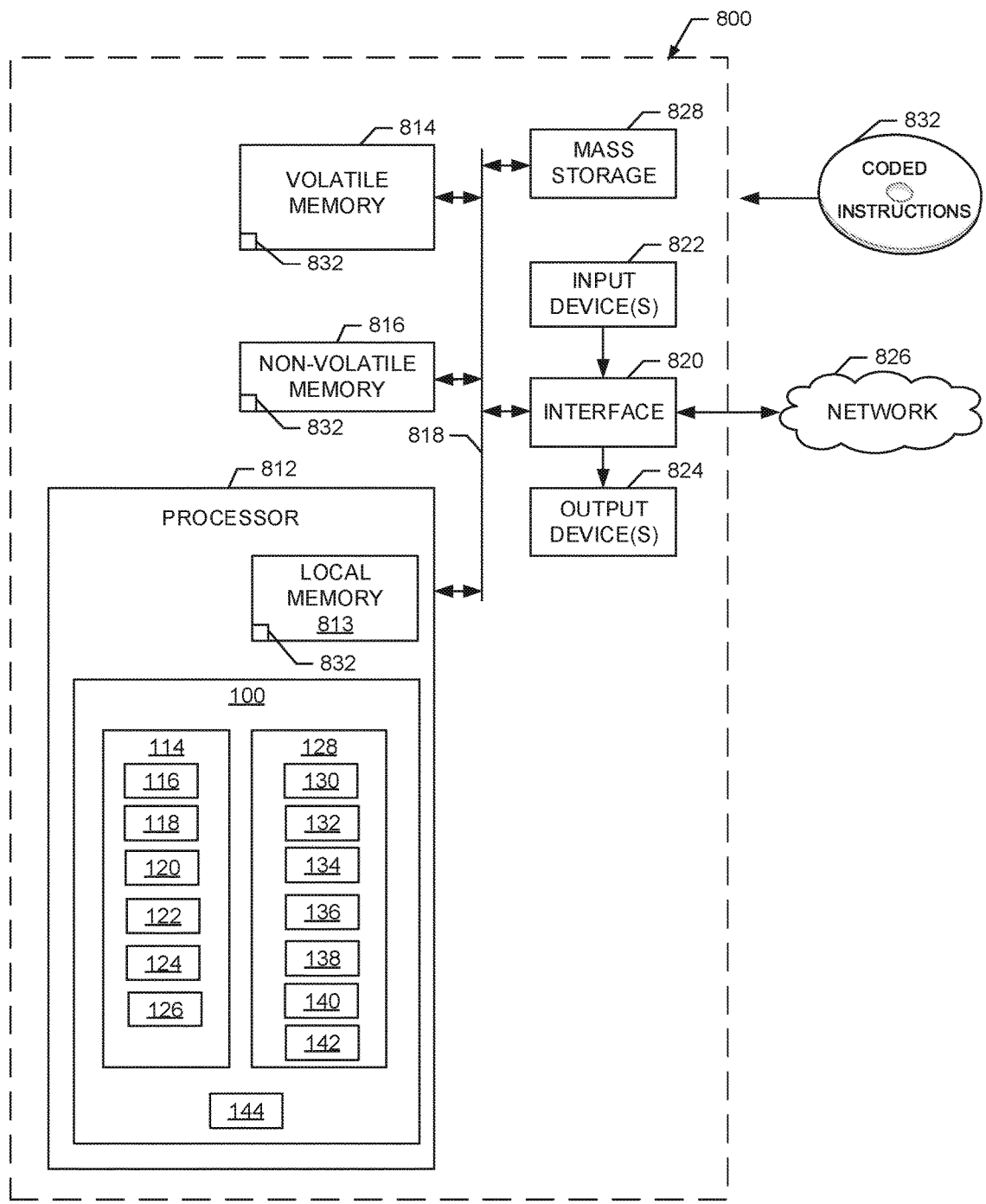
FIG. 8 is a block diagram of an example processor platform structured to execute example machine readable instructions represented by the example methods of FIGS. 2, 5A-5C, 6A-6D and 7 to implement the example navigation system of FIG. 1.

FIG. 8 is a block diagram of an example processor platform 800 capable of executing instructions to implement the methods of FIGS. 2, 5A-5C, 6A-6D and 7 and the navigation system 100 of FIG. 1. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, or any other type of computing device.

The processor platform 800 of the illustrated example includes a processor 812. The processor 812 of the illustrated example includes hardware that my implement one or more of the example CRAIDS edition module 114, the example User/Producer interface 116, the example AIDL production interface 118, the example AIDL common data structure interface 120, the example AIDL validation interface 122, the example AIDL serialization interface 124, the example security interface 126, the example CRAIDS consumption module 128, the example User/Consumer interface 130, the example AIDL production interface 132, the example runtime trajectory computation interface 134, the example AIDL common data structure interface 136, the example AIDL validation interface 138, the example serialization interface 140, the example security interface 142 and/or the example database 144 of the example navigation system 100 of FIG. 1. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) 822 can be implemented by, for example, an audio sensor, a microphone, a camera (still or video), a keyboard, a button, a mouse, a touchscreen, a track-pad, a trackball, isopoint and/or a voice recognition system.

One or more output device(s) 824 are also connected to the interface circuit 820 of the illustrated example. The output device(s) 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

Coded instructions 832 to implement the methods of FIGS. 2, 5A-5C, 6A-6D and 7 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus/systems and articles of manufacture employ CRAIDS to create, modify, etc. and/or implement (e.g., execute, compute, etc.) an aircraft trajectory. CRAIDS advantageously provides a common data structure for AIDL. In particular, CRAIDS centralizes the common functionality around an AIDL model in a universal data structure deployed in a component or system. CRAIDS organizes the AIDL model for efficient hierarchical composition. Further, the example methods, apparatus/systems and articles of manufacture provide a unified set of interfaces for various production and consumption systems. Also, the example methods, apparatus/systems and articles of manufacture provide a common runtime environment for trajectory computing.

Although certain example methods, apparatus/systems and articles of manufacture have been disclosed herein, the scope of coverage of this patent is not limited thereto. On the contrary, this patent covers all methods, apparatus/systems and articles of manufacture fairly falling within the scope of the claims of this patent. The description of different advantageous implementations has been presented for purposes of illustration and description, and is not intended to be exhaustive or limited to the implementations in the form disclosed. Many modifications and variations may be apparent to those of ordinary skill in the art. Furthermore, different advantageous implementations may provide different advantages as compared to other advantageous implementations.

What is claimed is:

1. A method comprising:
   determining an initial condition of a flight of an air vehicle;
   determining a flight constraint;
   determining, using a common runtime aircraft intent data structure (CRAIDS), an aircraft trajectory based on the initial condition and the flight constraint, wherein using the CRAIDS includes:
      determining a number of degrees of freedom of the air vehicle;
      determining a trajectory thread for each of the degrees of freedom, wherein each of the trajectory threads includes a series of instruction nodes including instructions that define how to fly the air vehicle according to the corresponding degree of freedom, and wherein each of the trajectory threads defines a branch of a hierarchical tree, the hierarchical tree including a root node defining the aircraft trajectory, the branches defined by each of the trajectory threads directly derived from the root node, such that each of the branches defines the aircraft trajectory according to a different one of the degrees of freedom;
      determining, for each of the trajectory threads, the instructions of the corresponding trajectory thread that satisfy the flight constraint;
      determining validity of each of the instructions of each of the trajectory threads;
      establishing a trigger node including a trigger associated with each of the instruction nodes in each of the trajectory threads, wherein each of the triggers determines an end of validity of the associated instruction and a start of validity of a subsequent instruction within the corresponding trajectory thread; and
      sequencing the instructions and the associated triggers in each of the trajectory threads to fly the air vehicle according to the instructions; and
      performing the determined aircraft trajectory during the flight of the air vehicle.

2. The method of claim 1, wherein determining the validity of each of the instructions includes at least one of a period of time, a value or range of values concerning a flight variable, or a validity of another instruction of either the same or another one of the trajectory threads.

3. The method of claim 1, wherein performing the determined aircraft trajectory includes:
   determining a set of operations to be performed by the air vehicle based on the determined aircraft trajectory; and
   commanding the air vehicle to execute the set of operations.

4. The method of claim 1, further including verifying aircraft intent description language (AIDL) syntax of the instructions of at least one of the trajectory threads of the determined aircraft trajectory.

5. The method of claim 1, wherein at least one of the instruction nodes of at least one of the trajectory threads is a composite node, the composite node including a set of instruction nodes with associated trigger nodes, wherein:
   fulfillment of a condition associated with a trigger in the trajectory thread that precedes the composite node starts the validity of a first instruction of the composite node; and
   fulfillment of a condition of a trigger in the composite node that is associated with a last instruction in the composite node starts the validity of an instruction in the trajectory thread that follows the composite node.

6. The method of claim 1, wherein at least one of the trajectory threads includes instructions to define motion of the air vehicle in a vertical plane.

7. The method of claim 1, wherein at least one of the trajectory threads includes instructions to define motion of the air vehicle in a horizontal plane.

8. The method of claim 1, wherein at least one of the trajectory threads includes instructions to define maneuvers of the air vehicle at each stage of the flight.

9. The method of claim 1, wherein at least one of the trajectory threads includes instructions to define a speed and an acceleration of the air vehicle.

10. The method of claim 1, wherein activation of one of the triggers establishes an end of validity of the associated instruction and a start of validity of an instruction in a trajectory thread following the activated trigger.

11. The method of claim 10, wherein activation of the trigger is subjected to a fulfillment of a condition specified by the trigger and/or to the activation of another trigger associated with another instruction in the same trajectory thread or another trajectory thread.

12. A method comprising:
   determining an initial condition of a flight of an air vehicle;
   determining a flight constraint;
   determining using a common runtime aircraft intent data structure (CRAIDS), an aircraft trajectory based on the initial condition and the flight constraint, wherein using the CRAIDS includes:
      determining a number of degrees of freedom of the air vehicle;
      determining a trajectory thread for each of the degrees of freedom, wherein each of the trajectory threads includes a series of instruction nodes including instructions that define how to fly the air vehicle according to the corresponding degree of freedom;
      determining, for each of the trajectory threads, the instructions of the corresponding trajectory thread that satisfy the flight constraint;
      determining validity of each of the instructions of each of the trajectory threads;
      establishing a trigger node including a trigger associated with each of the instruction nodes in each of the trajectory threads, wherein each of the triggers determines an end of validity of the associated instruction and a start of validity of a subsequent instruction within the corresponding trajectory thread; and
      sequencing the instructions and the associated triggers in each of the trajectory threads to fly the air vehicle according to the instructions; and
   performing the determined aircraft trajectory during the flight of the air vehicle, wherein performing the determined aircraft trajectory includes:
      determining a set of operations to be performed by the air vehicle based on the determined aircraft trajectory, wherein determining the set of operations includes:
         updating a state vector of the air vehicle;
         assessing, based on the state vector, which of the instructions in each of the trajectory threads are still valid by evaluating the triggers and conditions in each of the trajectory threads; and
         determining operations to be performed so that, when executed by the air vehicle, the air vehicle flies according to the instructions that are still valid; and commanding the air vehicle to execute the set of operations.

13. The method of claim 12, wherein determining the set of operations further includes:
obtaining the initial condition of the flight of the air vehicle;
determining a first operation of the set of operations, wherein the first operation includes first instructions in each of the trajectory threads and effects associated with the first instructions;
updating the state vector of the air vehicle while the first operation is performed, wherein the state vector includes a flight related variable;
assessing, based on the state vector, which of the instructions in each of the trajectory threads are still valid;
determining a next operation of the set of operations, wherein the next operation includes the instructions that are valid at a given stage of the aircraft trajectory and the effects associated with the valid instructions; and
completing the determined aircraft trajectory when none of the instructions associated with the trajectory threads are still valid.

14. A method comprising:
determining an initial condition of a flight of an air vehicle;
determining a flight constraint;
determining, using a common runtime aircraft intent data structure (CRAIDS), an aircraft trajectory based on the initial condition and the flight constraint, wherein using the CRAIDS includes:
determining a number of degrees of freedom of the air vehicle;
determining a trajectory thread for each of the degrees of freedom,
wherein each of the trajectory threads includes a series of instruction nodes including instructions that define how to fly the air vehicle according to the corresponding degree of freedom:
determining, for each of the trajectory threads, the instructions of the corresponding trajectory thread that satisfy the flight constraint;
determining validity of each of the instructions of each of the trajectory threads:
establishing a trigger node including a trigger associated with each of the instruction nodes in each of the trajectory threads, wherein each of the triggers determines an end of validity of the associated instruction and a start of validity of a subsequent instruction within the corresponding trajectory thread, and wherein at least one of the instruction nodes of at least one of the trajectory threads is a conditional composite node, the conditional composite node including at least two sets of instruction nodes with associated trigger nodes, wherein:
a. start of validity of either set of instruction nodes of the conditional composite node is subjected to fulfillment of a condition of the conditional composite node;
b. the fulfillment of the condition associated with a trigger in the trajectory thread that precedes the conditional composite node starts the assessment of the condition of the conditional composite node; and
c. the fulfillment of the condition of a trigger in the conditional composite node that associated with the last instruction in either set of instructions of the conditional composite node starts the validity of an instruction in the trajectory thread that follows the conditional composite node; and
sequencing the instructions and the associated triggers in each of the trajectory threads to fly the air vehicle according to the instructions; and
performing the determined aircraft trajectory during the flight of the air vehicle.

15. A method comprising:
determining an initial condition of a flight of an air vehicle;
determining a flight constraint;
determining, using a common runtime aircraft intent data structure (CRAIDS), an aircraft trajectory based on the initial condition and the flight constraint wherein using the CRAIDS includes:
determining a number of degrees of freedom of the air vehicle;
determining a trajectory thread for each of the degrees of freedom, wherein each of the trajectory threads includes a series of instruction nodes including instructions that define how to fly the air vehicle according to the corresponding degree of freedom;
determining, for each of the trajectory threads, the instructions of the corresponding trajectory thread that satisfy the flight constraint;
determining validity of each of the instructions of each of the trajectory threads;
establishing a trigger node including a trigger associated with each of the instruction nodes in each of the trajectory threads, wherein each of the triggers determines an end of validity of the associated instruction and a start of validity of a subsequent instruction within the corresponding trajectory thread, and wherein at least one of the instruction nodes of at least one of the trajectory threads is a loop node, the loop node including a set of instruction nodes with associated trigger nodes, wherein:
a. fulfillment of the condition associated with a trigger in the trajectory thread that precedes the loop node starts the assessment of a main condition of the loop node;
b. start of validity of a first instruction of the set of instructions including the loop node is subjected to the fulfillment of the main condition of the loop node;
c. if the main condition of the loop node is not fulfilled, the validity of the loop node ends and starts the validity of an instruction in the trajectory thread that follows the loop node; and
d. fulfillment of the condition of a trigger node that is associated with the last instruction node in the set of instruction nodes starts the assessment of the main condition of the loop node; and
sequencing the instructions and the associated triggers in each of the trajectory threads to fly the air vehicle according to the instructions; and
performing the determined aircraft trajectory during the flight of the air vehicle.

16. A method comprising:
determining an initial condition of a flight of an air vehicle;
determining a flight constraint;
determining, using a common runtime aircraft intent data structure (CRAIDS), an aircraft trajectory based on the initial condition and the flight constraint, wherein using the CRAIDS includes:

determining a number of degrees of freedom of the air vehicle;

determining a trajectory thread for each of the degrees of freedom, wherein each of the trajectory threads includes a series of instruction nodes including instructions that define how to fly the air vehicle according to the corresponding degree of freedom;

determining, for each of the trajectory threads, the instructions of the corresponding trajectory thread that satisfy the flight constraint;

determining validity of each of the instructions of each of the trajectory threads;

establishing a trigger node including a trigger associated with each of the instruction nodes in each of the trajectory threads, wherein each of the triggers determines an end of validity of the associated instruction and a start of validity of a subsequent instruction within the corresponding trajectory thread, and wherein deletion of one of the instruction nodes deletes all sets of instructions included in the deleted instruction node; and sequencing the instructions and the associated triggers in each of the trajectory threads to fly the air vehicle according to the instructions; and performing the determined aircraft trajectory during the flight of the air vehicle.

17. A computer readable storage medium comprising instructions that, when executed, cause a machine to at least:

determine an initial condition of a flight of an air vehicle;

determine a flight constraint;

determine, using a common runtime aircraft intent data structure (CRAIDS), an aircraft trajectory based on the initial condition and the flight constraint, wherein, to use the CRAIDS, the instructions cause the machine to at least:

determine a number of degrees of freedom of the air vehicle;

determine a trajectory thread for each of the degrees of freedom, wherein each of the trajectory threads includes a series of instruction nodes including instructions that define how to fly the air vehicle according to the corresponding degree of freedom, and wherein each of the trajectory threads defines a branch of a hierarchical tree, the hierarchical tree including a root node defining the aircraft trajectory, the branches defined by each of the trajectory threads directly derived from the root node, such that each of the branches defines the aircraft trajectory according to a different one of the degrees of freedom;

determine, for each of the trajectory threads, the instructions of the corresponding trajectory thread that satisfy the flight constraint;

determine validity of each of the instructions of each of the trajectory threads;

establish a trigger node including a bigger associated with each of the instruction nodes in each of the trajectory threads, wherein each of the triggers determines an end of validity of the associated instruction and a start of validity of a subsequent instruction within the corresponding trajectory thread; and sequence the instructions and the associated triggers in each of the trajectory threads to fly the air vehicle according to the instructions; and perform the determined aircraft trajectory during the flight of the air vehicle.

18. The computer readable storage medium of claim 17, wherein activation of one of the triggers establishes an end of validity of the associated instruction and a start of validity of an instruction in a trajectory thread following the activated trigger.

19. The computer readable storage medium of claim 18, wherein activation of the trigger is subjected to a fulfillment of a condition specified by the trigger and/or to the activation of another trigger associated with another instruction in the same trajectory thread or another trajectory thread.

* * * * *

UNITED STATES PATENT AND TRADEMARK OFFICE
CERTIFICATE OF CORRECTION

PATENT NO. : 10,223,921 B2
APPLICATION NO. : 15/251721
DATED : March 5, 2019
INVENTOR(S) : Navarro Felix et al.

It is certified that error appears in the above-identified patent and that said Letters Patent is hereby corrected as shown below:

In the Claims

Column 28, Line 16 (Claim 17), please replace the word "bigger" with the word "trigger"

Signed and Sealed this
Sixteenth Day of April, 2019

Andrei Iancu
*Director of the United States Patent and Trademark Office*